United States Patent [19]
Sasaki et al.

[11] Patent Number: 5,073,886
[45] Date of Patent: Dec. 17, 1991

[54] SIGNAL REPRODUCING CIRCUITRY AND SIGNAL REPRODUCING METHOD FOR OPTICAL DISC PLAYER

[75] Inventors: Tooru Sasaki, Matsubara; Nobukazu Hosoya, Nara, both of Japan

[73] Assignee: Sanyo Electric Co., Ltd., Moriguchi, Japan

[21] Appl. No.: 321,821

[22] Filed: Mar. 10, 1989

[30] Foreign Application Priority Data

Mar. 11, 1988 [JP] Japan ................................. 1-58614

[51] Int. Cl.$^5$ ........................... H01G 4/20; H04J 3/00
[52] U.S. Cl. ....................................... 369/60; 369/107
[58] Field of Search ................ 369/60, 32, 44.41, 107, 369/44.42, 124; 358/320, 322, 325, 340, 327

[56] References Cited

U.S. PATENT DOCUMENTS

| | | | |
|---|---|---|---|
| 4,366,564 | 12/1982 | de Haan et al. | 369/60 |
| 4,726,004 | 2/1988 | Takasago et al. | 369/32 |
| 4,785,441 | 11/1988 | Tanaka et al. | 369/44.41 |
| 4,845,701 | 7/1988 | Nakata | 369/124 |

FOREIGN PATENT DOCUMENTS

| | | |
|---|---|---|
| 60-23932 | 2/1985 | Japan . |
| 63-25832 | 2/1988 | Japan . |
| 63-58625 | 3/1988 | Japan . |

OTHER PUBLICATIONS

"Laser Disc Technical Book", by Pioneer Kabushiki Kaisha, Kabushiki Kaisha ASCII, Nov. 1, 1986.

Primary Examiner—Aristotelis Psitos
Assistant Examiner—Varsha V. Sheladia
Attorney, Agent, or Firm—Armstrong, Nikaido, Marmelstein, Kubovcik & Murray

[57] ABSTRACT

Provided is a signal reproducing circuit for an optical disc player including a multidivisional photodetector with photoelectric converting elements in a preceding side and photoelectric converting elements in a succeeding side relative to a proceeding direction of pits of an optical disc, a variable delay circuit for delaying outputs from the photoelectric converting elements in the preceding side, a circuit for detecting a time difference between an output from the photo electric converting elements in the succeeding side and an output from the variable delay circuit, and a circuit responsive to an output from the time difference detecting circuit for changing a delay time of the variable delaying circuit. The signal reproducing circuit further includes a circuit for amplifying and correcting high frequency components of signals reproduced by the photo detector in response to the output from the time difference detecting circuit. This structure extends a reproduced frequency band, improves a high frequency characteristic of the video signals reproduced from the optical disc and supplies video signals having superior frequency characteristics.

13 Claims, 17 Drawing Sheets

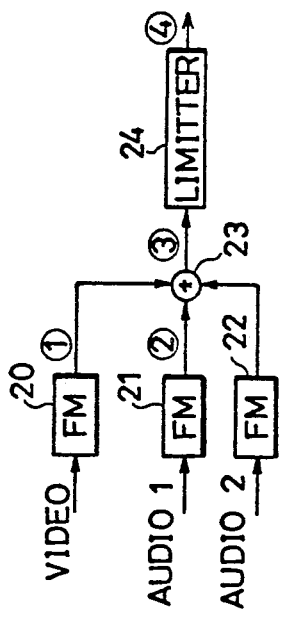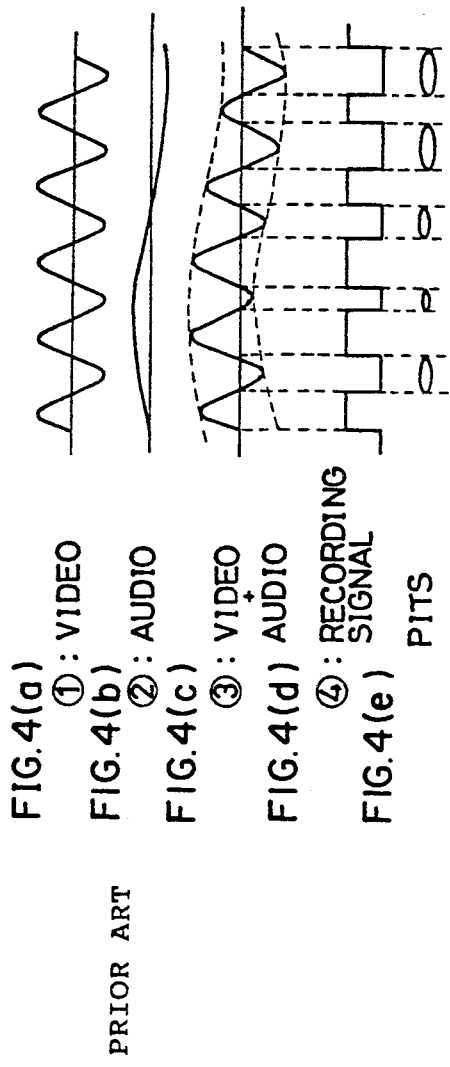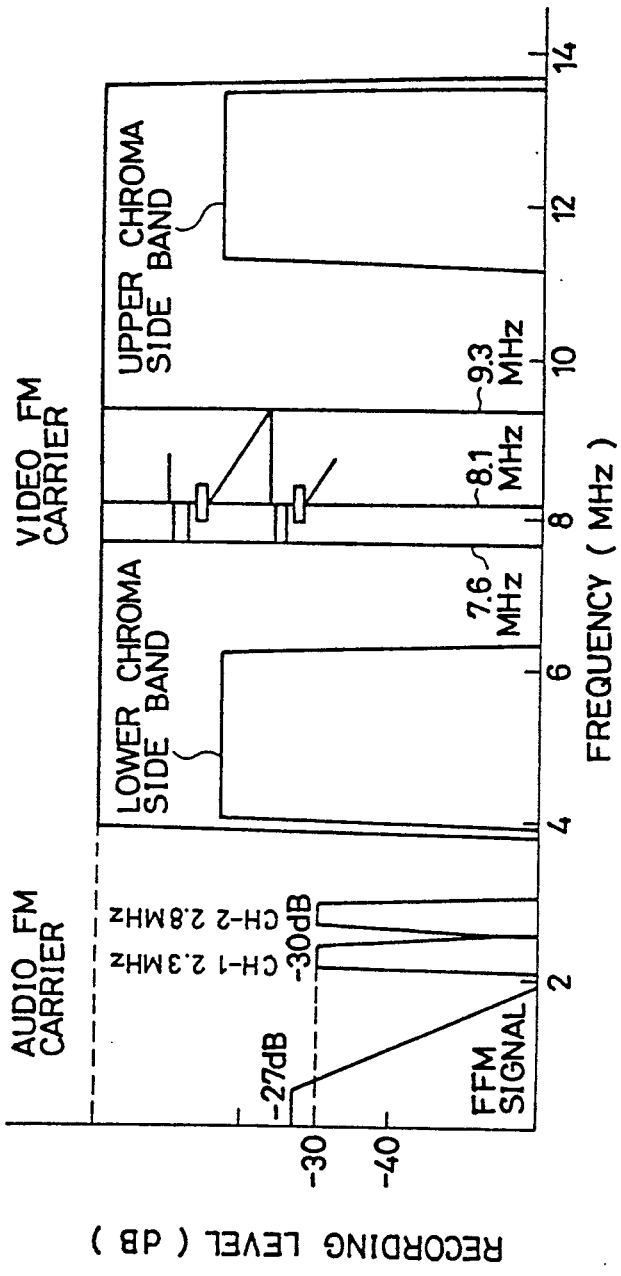

WITH PHASE DEFFERENCE

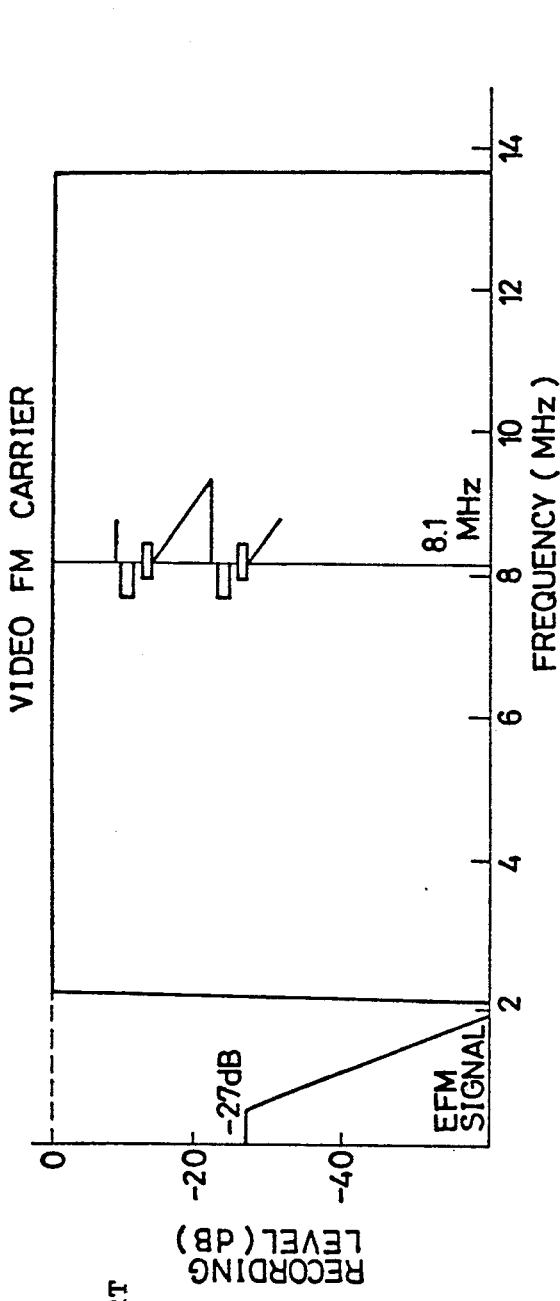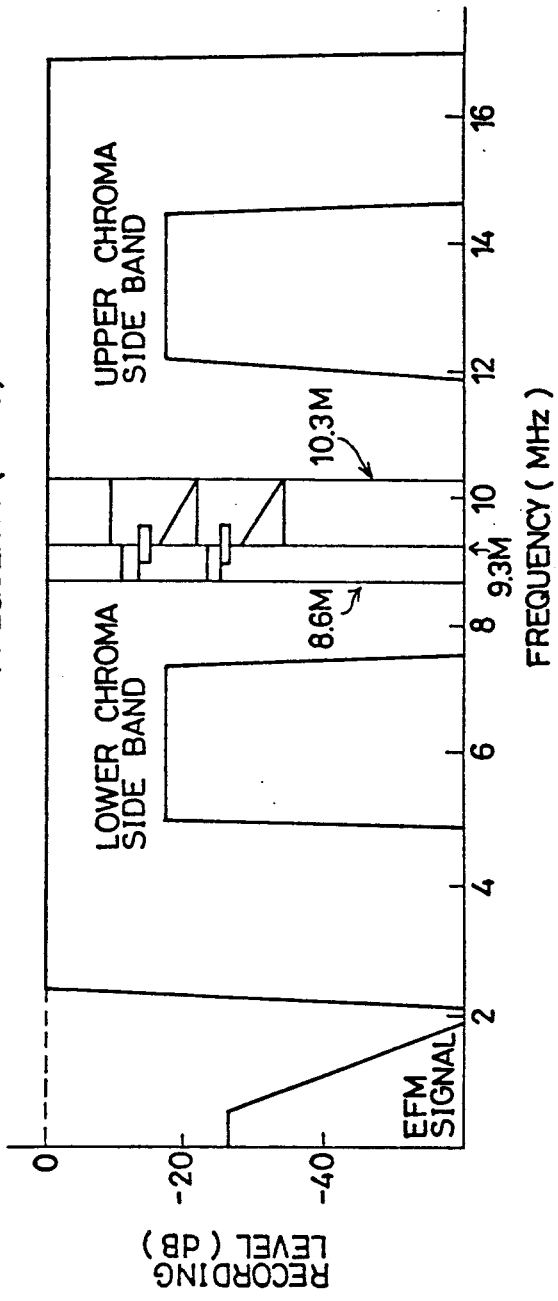
FIG.21 PRIOR ART
FIG.22 PRIOR ART

OUTPUT FROM ADDER 54

OUTPUT FROM HIGH FREQUENCY CORRECTING CIRCUIT

OUTPUT FROM LIMITER 77

OUTPUT FROM FM DETECTOR 78

OUTPUT FROM ADDER 54

OUTPUT FROM HI-FREQ CORRECTING CIRCUIT

OUTPUT FROM LIMITER 77

OUTPUT FROM FM DETECTOR 78

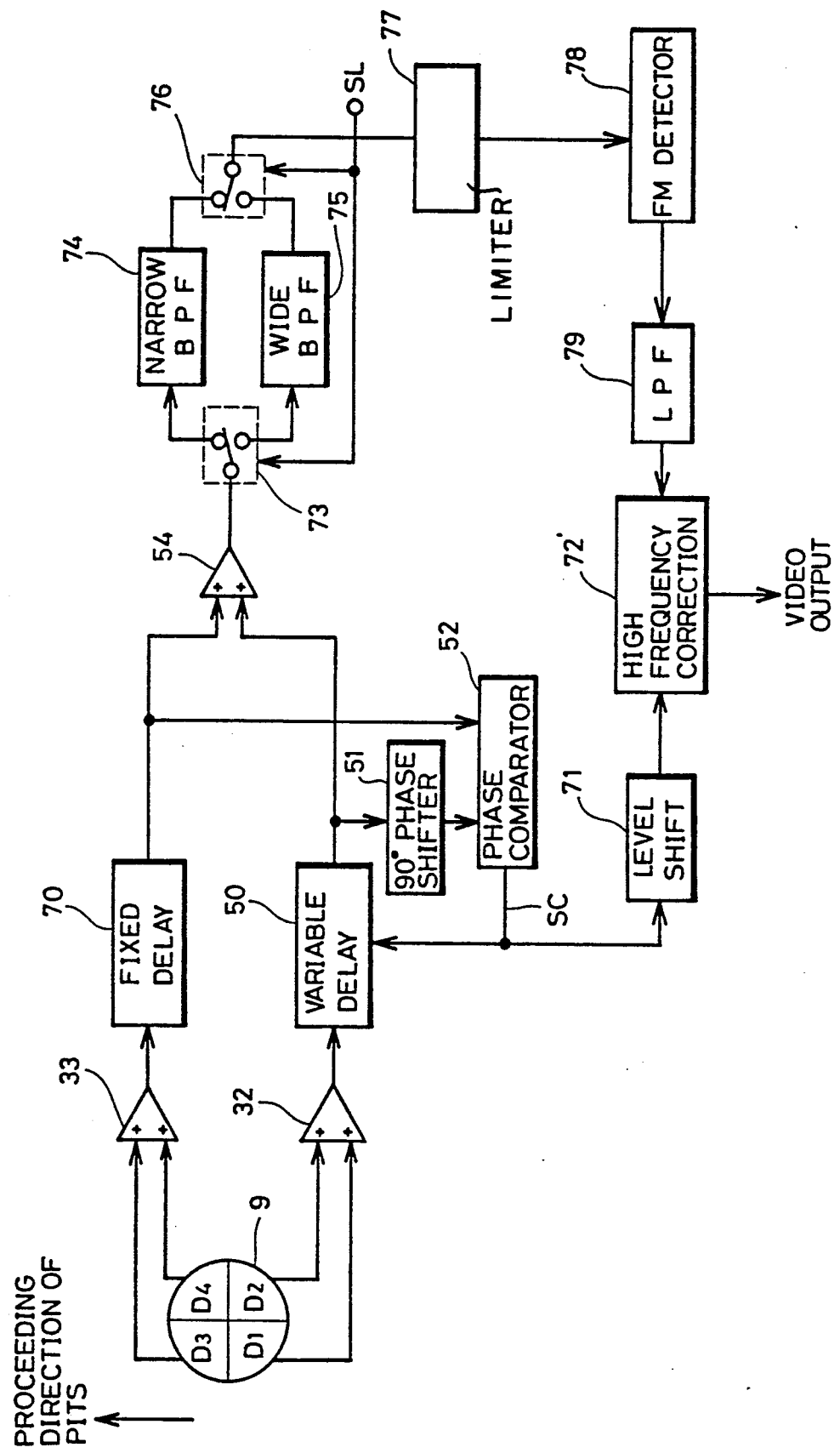

OUTPUT FROM ADDER 54

OUTPUT FROM LIMITER 77

OUTPUT FROM FM DETECTOR 78

OUTPUT FROM HIGH FREQUENCY CORRECTING CIRCUIT 72'

OUTPUT FROM ADDER 54

OUTPUT FROM LIMITER 77

OUTPUT FROM FM DETECTOR 78

OUTPUT FROM HI-FREQ CORRECTING CIRCUIT 72'

SIGNAL REPRODUCING CIRCUITRY AND SIGNAL REPRODUCING METHOD FOR OPTICAL DISC PLAYER

BACKGROUND OF THE INVENTION

1. Field of the Invention

The present invention relates to a signal reproducing circuitry in an optical disc player and signal reproducing method thereof. More specifically, the present invention relates to circuitry and a method for reproducing video signals from a laser vision type optical disc on which video signals are recorded, without attenuating high frequency components of the video signals.

2. Description of the Background Art

An optical disc has been known as a medium capable of recording information in a high density. Video and/or audio information is recorded on the optical disc in the manner of presence/absence of reflection of light. The presence/absence of the light reflected therefrom is provided by projections called pits formed on the optical disc corresponding to signals to be recorded.

A system for reading the information recorded on the optical disc by means of a laser beam is generically called an optical disc system. An optical disc on which video information is recorded is called a video disc. An optical disc on which only audio information is recorded is called a digital audio disc DAD. A compact digital audio disc which has the diameter of 12 cm and the thickness of 1.2 mm is called a compact disc CD.

A schematic structure of an optical pickup portion of the optical disc system is shown in FIG. 1. Referring to FIG. 1, the optical pickup portion comprises: a laser light source 1 emitting a laser beam of a prescribed wavelength; a collimator lens 2 and a refractive grating 3 for transporting the laser beam from the laser light source 1 into a parallel beam; a polarized beam splitter (half mirror) 4 for changing the direction of the given laser beam (from the laser light source 1 or from the optical disc 10); a quarter wave plate 6 for delaying the laser beam from the polarized beam splitter 4 and the laser beam reflected from the optical disc 10 by prescribed phases, respectively; an objective lens 7 for decreasing the beam diameter of the laser beam from the quarter wave plate 6 to apply a beam spot having a prescribed diameter on a recording surface of the optical disc and for transforming the laser beam reflected from the optical disc 10 into a parallel laser beam to be applied to the quarter wave plate 6; and a lens 8 for decreasing the diameter of the laser beam reflected from the polarized beam splitter 4 to form a beam spot on a photo detector 9.

A semiconductor laser (laser diode) having a wavelength of, for example, 780nm is employed as the laser light source 1.

The polarized beam splitter 4 allows passage of a laser beam having a particular plane of vibration and reflects a laser beam whose phase is shifted by 90° from the particular plane of vibration.

The quarter wave plate 6 provides a 90° phase delay for a laser beam which goes and returns therethrough. More specifically, the direction of polarization (plane of vibration) of the laser beam from the polarized beam splitter 4 to the quarter wave plate 6 is shifted by 90° from the direction of polarization of the laser beam from the quarter wave plate 6 to the polarized beam splitter 4.

The objective lens 7 applies a beam spot having the beam diameter of about 1.5 μm on the recording surface of the optical disc 10.

The lens 8 comprising, for example, a condenser lens and a cylindrical lens is positioned such that it applies a circular beam spot on the photo detector 9 when the objective lens 7 and the recording surface of the optical disc 10 is spaced apart by a prescribed distance.

The photo detector 9 has for example a quadrant structure as shown in the figure and comprises a pair of photo detectors (for example photo diode) provided in a preceding side and a pair of photo detectors provided in a succeeding side, respectively, with respect to the direction of rotation of the optical disc 10 (the proceeding direction of the pit 11).

FIG. 2 schematically shows a cross sectional structure of the optical disc 10. Referring to FIG. 2, the optical disc 10 comprises a disc base 14 which is a transparent plastic; a reflective layer 13 formed of, for example aluminum on one surface of the disc base 14; and a coating layer 12 for protecting the reflective layer 13. Pits 11 are formed on one surface of the disc base. The width of the pit 11 is generally 0.4 μm. The length and the space between the pits are various ranging from the minimum 0.5 μm to the maximum 2.4 μm dependent on the recorded information. The depth d of the pit 11 is about 0.1 μm, which is selected to be approximately ¼ of the wavelength of the incidental laser beam so as to ensure presence/absence of the reflection of the beam. The pits are spirally formed on one surface of the optical disc 10 with the track pitch of 1.67 μm. The operation of the optical pickup portion will be briefly described in the following with reference to FIGS. 1 and 2.

The laser beam from the laser light source 1 passes through the collimator lens 2 and the diffractive grating 3 to be a parallel beam. The parallel beam, whose direction is changed by the polarized beam splitter 4, passes through the quarter wave plate 6 to enter the objective lens 7. The laser beam applied to the objective lens 7 is converged to irradiate the reflective layer 13 of the optical disc 10. The laser beam reflected from the optical disc 10 again passes through the objective lens 7 and the quarter wave plate 6 to enter the polarized beam splitter 4. The phase of the laser beam which went and returned through the quarter wave plate 6 is delayed by 90° from the phase of the original laser beam, and the plane of vibration (direction of polarization) is rotated by 90°. Therefore, the laser beam reflected from the optical disc 10 which has passed the quarter wave plate 6 has its proceeding direction changed by 90° by the polarized beam splitter 4 to be converged on the photo detector 9 through the lens 8. The photo detector 9 converts the given laser beam into electrical signals, from which the information recorded on the optical disc 10 (presence/absence of the pits) is reproduced. When the laser beam irradiates the pit 11, the intensity of the reflected light returning to the objective lens 7 is reduced due to an interference (diffraction effect) of the light reflected from the pit portion (projecting portion) and from the land portion (flat portion). Meanwhile, if there is no pit 11, the reflected light fully returns to the objective lens 7. This difference of the light intensity is detected by the photo detector 9 and is converted into an electrical signal.

It is also possible in the pickup structure to remove the above described quarter wave plate 6 and polarized beam splitter 4 and, instead, to dispose only a half mirror to permit the laser beam traveling from the laser light source onto the disc and to permit only a reflected laser beam reaching the photo detector 9.

If the optical disc 10 is an optical video disc, then both video and audio signals are recorded thereon. A method for recording signals on the video disc will be briefly described in the following.

FIG. 3 shows a schematic structure of a recording signal processing portion. Referring to FIG. 3, the recording signal processing portion comprises an FM modulator 20 for FM modulating analog video signal, FM modulators 21 and 22 for FM modulating 2 channels of analog audio signals, an adder 23 for adding the outputs from the FM modulators 20, 21 and 22, and a limiter 4 for limiting amplitude of the output from the adder 23.

FIG. 4 shows waveforms of output signals from respective portions of the circuits shown in FIG. 3. The operation of recording signals on the optical video disc will be described in the following with reference to FIGS. 3 and 4. An FM wave ① of the video signal FM modulated by L the FM modulator 20 and FM waves of the ② channels of audio signals FM modulated by the FM modulators 21 and 22 are added by the adder 23. In the adder 23, the video FM wave ① is used as a carrier, and the carrier is amplitude-modulated by the audio FM wave ② to provide a signal ③. The limiter 24 limits the amplitude of the signal ③ from the adder 23 by slicing the same at a prescribed level to provide a recording signal 4. As is clear in FIG. 4, the recording signal 4 is provided by pulse width modulating the video signal carrier by the audio signal. Pits are formed on the recording surface of the optical disc corresponding to "1" and "0" of the recording signal ④.

FIG. 5 shows a frequency spectrum of the recording signal of the optical video disc. In FIG. 5, a frequency spectrum of a recording signal which is a color signal of the NTSC (National Television System Committee) system is shown. A video signal band occupies 4 MHz to 13.5 MHz. The color video signal is so FM modulated that the band becomes 4.2 MHz, a sync tip becomes 7.6 MHz, a pedestal level becomes 8.1 MHz and a white peak becomes 9.3 MHz. The frequency band from 4 MHz to 13.5 MHz include FM deviation range and upper and lower chroma side bands as FM video signals.

The analog audio 2 channels are FM modulated to have the carrier frequency of 2.3 MHz and 2.8 MHz, respectively, with the frequency deviation +100 KHz. In the frequency range lower than 2 MHz of FM audio signal, digital audio signals having the same format as the compact disc CD are recorded by frequency multiplexing. The recording level of the audio signals is lowered by −26dB to −30dB from that of the video signals in order to prevent disturbance of the video signals. The digital audio signals are EFM (eight to fourteen modulation) modulated. The term EFM means a method of converting 8 bit data into 14 bit data, in which $2^8$ patterns having the minimum pulse width of 3T, and the maximum pulse width of 11T are extracted from $2^{14}$ patterns, and input 8 bit data are allotted to the extracted 14 bit patterns in one to one correspondence. The reference character T represents a pulse width (transmission rate) of 1 bit data. The operation of reproducing signals from the photo detector 9 shown in FIG. 1 will be hereinafter described.

FIG. 6 shows a conventional circuitry for reproducing signals from the optical disc. The circuit of FIG. 6 comprises three adders 32, 33 and 34.

The photo detector 9 has a quadrant sensor structure including a pair of photoelectric converting elements (for example, photo diode) D1 and D2 in the preceding side and a pair of photoelectric converting elements D3 and D4 in the succeeding side with respect to the direction of the pits.

The adder 32 adds electric signals S1 and S2 from the photoelectric converting elements D1 and D2. The adder 33 adds the electric signals S3 and S4 from the photoelectric converting elements D3 and D4. The adder 34 adds output signals from the adders 32 and 33 to provide a reproduced FM signal (RF signal). More specifically, by adding all the outputs from four photoelectric converting elements D1 to D4, the reflected light image from the optical disc 10 applied to the photo detector 9 is converted into an electric signal, and the signals reproduced by respective photoelectric converting elements D1 to D4 are all added to provide correct reproduced signal corresponding to the recorded information.

A method for controlling rotation of the optical disc may be a CLV (Constant Linear Velocity) method in which density of information can be made constant from the inner track to the outer track of the optical disc or CAV (Constant Angular Velocity) method in which the number of rotation per unit time of the optical disc is made constant may be employed. In the CVL method, the number of rotation of the optical disc per unit time is so controlled that the linear velocity of reproducing points of the optical disc is kept constant. In the CAV method, the linear velocity of the reproducing points changes, so that the length of the pit corresponding to the same data becomes different at the inner track and the outer track of the optical disc.

A frequency characteristics of the pit recorded on the optical disc reproduced by the optic pickup will be represented as $$\text{pickup output} \propto 1 + \cos\left(\frac{f}{f_{co}}\pi\right)$$

$$f_{co} = \frac{2v}{\lambda} NA$$

where λ represents wavelength of the laser beam, v represents linear velocity of the optical disc at the reproducing point and NA represents numerical aperture of the objective lens.

As is apparent from the above equation, the output characteristic of the pickup is degraded as the frequency of the reproduced signal becomes higher. The degradation of the frequency characteristics in the higher range of the reproduced signal will be discussed in the following.

A diameter A of a focused beam spot (beam waist) of a common laser beam employed in a pickup for reproducing laser vision is provided in accordance with the following equation from the wavelength λ of the laser beam from the laser light source and from the numerical aperture NA of the objective lens.

$$\text{beam spot diameter} = K\lambda/NA,$$

where K is a constant determined by intensity distribution of the incidental laser beam and by the shape of the lens aperture. When $\lambda=780$nm, NA$=0.53$ and K$=1$, the beam spot diameter A will be $$A = 780 \times 10^{-9} \quad 0.53 \simeq 1.5 \times 10^{-6}$$
$$= 1.5 \ \mu m$$

The distribution of the light intensity in the beam spot is not actually uniform but varies at the central portion and the peripheral portion of the beam spot as shown in FIG. 7. The beam becomes weak at the peripheral portions. Assuming that a beam spot, having a radius of 0.5 $\mu$m at which the intensity thereof decreases by 3dB from that at the central portion, irradiates a recording surface of an optical disc and that the intensity in the beam spot of the radius of 0.5 $\mu$m (diameter of 1.0 $\mu$m) is uniform. The critical frequency, at which signal reproduction becomes impossible, is found in the following manner, when the recorded information on the optical disc is to be reproduced by the beam spot having the diameter of 1.0 $\mu$m.

FIGS. 8A to 8C show positional relation between the beam spot and the pit. In FIGS. 8A to 8C, the reference characters B1, B2, B3 and B4 represent corresponding divided regions of the photoelectric converting elements D1, D2, D3 and D4 on the beam spot. Referring to FIG. 8A, the beam spot 19 illuminates one pit 11 only, and the recorded information is surely reproduced in this case. In FIG. 8C, the beam spot 19 illuminates two spots and the two pits cannot be distinguished from each other, so that the recorded information cannot be reproduced. In FIG. 8B, the photoelectric converting elements (B3, B4) in the succeeding side alone detect the pit 11, which state defines the critical frequency enabling reproduction. Therefore, the critical frequency for reproduction $f_{max}$ can be provided when we consider a case in which the minimum pit lengths becomes equal to a half of the beam spot diameter L, that is, the radius of the beam spot. In other words, the frequency when the diameter L of the beam spot 19 corresponds to the minimum 1 wavelength of the pulse signals to be recorded can be regarded as the critical frequency for reproduction $f_{max}$. Therefore, $$f_{max} = V / L$$

can be applied. The reference character v is a linear velocity at the reproducing point of the optical disc.

For example, in the optical disc player employing the CLV method, the linear velocity of the optical disc is constantly 10.7 m/s, so that $$f_{max} = 10.7(m/s) \div 1.0(\mu m)$$
$$= 10.7 \ MHz$$

In the optical disc player employing the CAV method, the linear velocity at the reproducing points of the optical disc changes from 10.7m/s to 32m/s from the inner track to the outer track of the optical disc in correspondence with the reproducing points in the radial direction (with the number of rotation being 1800rpm), and therefore, $$f_{max} = (10.7m/s \sim 32m/s) \div 1.0(\mu m)$$
$$= 10.7 \sim 32 \ MHz$$

Therefore, when the beam spot diameter is 1.0 $\mu$m and the linear velocity of the reproducing points on the optical disc is 10.7m/s, the frequency characteristic of the reproduced signal has a 0 point at 10.2MHz as is shown by a solid line in FIG. 9. The 0 point changes dependent on the linear velocity of the optical disc, so that the higher frequency components of the reproduced signals are modulated by the linear velocity of the reproducing points on the optical disc.

The frequency providing the 0 point is included in the frequency range employed for the presently used laser vision of the NTSC system (the range represented by the character Q in FIG. 9), so that the higher frequency components of the reproduced signals cannot be correctly reproduced.

Meanwhile, in a magazine "TELEVI GIJUTSU" Jan., 1987, pp. 100, the structure shown in FIG. 10 is proposed. As is apparent from a comparison between the structure of FIG. 10 with that of FIG. 1, a delay circuit 37 having a prescribed delay time is interposed between the adders 32 and 34 in the proposed system. The delay circuit 37 delays reproduced signals from the photoelectric converting elements D1 and D2 in the preceding side by a prescribed time period.

Generally, the pit image of the optical disc formed on the photo detector 9 moves at a high speed as the optical disc rotates. Therefore, at the peak of the laser beam reflected from the optical disc, there will be an "offset" between the photoelectric converting elements D1 and D2 in the preceding side and the photoelectric converting elements D3 and D4 in the succeeding side. The time difference (positional offset) in the output waveforms from the photoelectric converting elements D1 and D2 in the preceding side and from the photoelectric converting elements D3 and D4 in the succeeding side are as small as about 10 to 17nsec. However, by simply adding the output from the photoelectric converting elements D1 to D4, the reproduced signal level will be smaller by the above mentioned time difference (phase difference). In order to eliminate the time difference (phase difference), the delay time of the delay circuit 37 is fixedly set at the above mentioned time difference, so as to eliminate the time difference between the output from the photoelectric converting elements D1 and D2 in the preceding side and the output from the photoelectric converting elements D3 and D4 in the succeeding side.

The above described frequency characteristics might be improved by applying the proposed system. More specifically, when the delay time of the delay circuit 37 is set at (L/2·v) (=a half of the beam spot diameter/linear velocity of the optical disc) in advance, the positional relation between the beam spot 19 and the pit 11 with respect to the electrical signal processing will be as shown in FIG. 11. Namely, the portion of the beam spot detected by the photoelectric converting elements D1 and D2 in the preceding side overlaps with the portion of the beam spot detected by the photoelectric converting elements D3 and D4 in the succeeding side, as viewed from the point of electrical signal processing, so that the diameter L of the beam spot will be equivalently L/2.

Consequently, the frequency characteristics of the reproduced signals will be the curve shown by the dotted line in FIG. 9. Namely, the above mentioned 0 point can be moved from 10.7MHz to $10.7 \times 2 = 21.4$MHz. Accordingly, the 0 point goes out of the frequency range Q employed for the present laser vision system, thereby improving the frequency characteristic of the reproduced signals.

However, even if the diameter of the beam spot is made ½ equivalently by applying the above proposed system, there still remain the following problem.

In the above described structure, the outputs of the photoelectric converting elements D1 and D2 in the preceding side are delayed by a fixed time period, and the fixed time period is selected to be $(L/2)/v$. Therefore, due to the change of the linear velocity of the optical disc employing the CAV method or the CLV or due to the change of the linear velocity of the optical disc derived from a jitter of the servo system maintaining the linear velocity of the optical disc at a prescribed value, the above described 0 point inevitably moves and it cannot be fixed. In other words, the high frequency components of the laser vision is modulated by the linear velocity of the optical disc, preventing accurate reproduction of the high frequency components of the reproduced signals.

A focus servo system (not shown) is provided for controlling the position of the objective lens 7 such that a distance between the objective lens 7 and the recording surface of the optical disc 10 is always kept constant. When a jitter is generated in the focus servo system, the focusing position of the laser beam fluctuates and the intensity distribution in the laser beam changes, so that the effective beam spot diameter L (in which the intensity distribution is uniform) changes. However, the delay time cannot be changed corresponding to the change of the effective beam spot diameter, since the delay time of the delay circuit 37 is fixed. Consequently, the aforementioned 0 point moves.

Even if the above mentioned 0 point can be set at the frequency of about 21.4 MHz, the degradation of the high frequency characteristic of the reproduced signals is inevitable, and therefore extensive defining of the reproduced images, which has been strongly desired recently, cannot be realized. The degradation of the high frequency characteristic will be discussed in the following.

In order to extensively define the reproduced images, much information must be recorded. In order to extensively define the reproduced images with the number of rotation of the optical disc kept as it is, that is, the central frequency kept as it is, the frequency range employed for the video signals must be widened. There are three methods of widening the video signal band, which are shown in FIGS. 12B to 12D, respectively. The frequency spectrum of the recording signals of a conventional laser vision optical disc is schematically shown in FIG. 12A for comparison.

In the method shown in FIG. 12B, FM audio signals are eliminated and the FM video signal band is widened in both lower and higher ranges.

In the method shown in FIG. 12C, the FM audio signals are maintained in the similar manner as in the conventional method (FIG. 12A) and only the higher range of the FM video signal is widened. The energy (recording level) of the widened region is doubled.

In the method shown in FIG. 12D, the FM audio signals are eliminated and only the lower range of the FM video signals is widened. The energy (recording level) of the widened lower region is doubled.

However, in the method shown in FIGS. 12C and 12D, the signal processing in the RF stage (after FM modulation) in recording on the optical disc becomes complicated compared with the method shown in FIG. 12B, and it is technically impossible to provide a filter satisfying the frequency characteristics such as shown in FIGS. 12C and 12D. Accordingly, it is the best to realize extensive definition of the reproduced images by applying the method shown in FIG. 12B.

When signals are to be optically reproduced by using an optical pickup as described in the foregoing, the diameter of the laser beam is selected to be wider than the width of the pit in order to surely detect the presence/absence of the pit. Consequently, the resolution in signal detection (pit detection) is decreased, and the higher frequency components of the reproduced FM signals (RF signals) are degraded as shown in FIG. 13. The tendency of degradation becomes more apparent as the frequency of the reproduced FM signals becomes higher and the reproducing position becomes nearer to the disc inner track, in an optical disc employing the CAV method as shown in FIG. 13. The higher frequency components are more degraded in the inner track of the CAV disc for the following reason. As described in the foregoing, the linear velocity at the reproduction points of the CAV disk changes from 10.75m/s to 32m/s from the inner track to the outer track. In order to make the signal reproducing velocity constant from the inner track to the outer track of the optical disc, the length of the pits representing the same signal is made longer at the outer peripheral portions of the disc, and the length of the pit at the outer most track of the disc is three times as long as that of the inner most track. In the case of an optical disc employing the CLV method, the same degradation of the higher frequency as generated in the inner track of the optical disc of the CAV method occurs over all portions of the optical disc.

One of the conventional method to solve the problem of the degradation of the higher frequency characteristics is disclosed in Japanese Patent Laying-Open Gazette No. 80603/1986, in which the higher frequency components of the reproduced FM signals are enhanced. A schematic circuit structure for carrying out the conventional method of enhancing the higher frequency components is shown in FIG. 14. Referring to FIG. 14, the conventional signal reproducing circuit comprises a pickup 41 for optically detecting signals recorded on the optical disc 10 and for converting the same into electric signals; a preamplifier 42 for amplifying outputs from the pickup 41; a high frequency amplifying correcting circuit 43 for amplifying high frequency components of the signals from the preamplifier 42 and for correcting the high frequency components; a limiter 44 for limiting amplitude of the outputs from the high frequency amplifying correcting circuit 43; and an FM demodulator 45 for reproducing video signals by FM detecting the outputs from the limiter 44.

The high frequency amplifying correcting circuit 43 has high frequency correcting characteristics such as shown in FIG. 15. In FIG. 15, the solid line represents an output characteristic of the pickup 41, a chain dotted line represents a signal characteristic after the high frequency correction, and the dotted line represents correction characteristic of the high frequency amplifying correcting circuit 43. The reference characters A B and C represents disc outer periphery (diameter 290 mm), the disc central portion (diameter 200 mm) and the disc inner track (diameter 110 mm), respectively. As shown in FIG. 15, the amount of correction of the high frequency amplifying correcting circuit 43 becomes the largest at the inner track of the disc.

In reproducing information on the optical disc employing the CAV method, the amount of correction of the high frequency amplifying correcting circuit 43 is switched in correspondence with the reproducing position in the radial direction of the optical disc to correct high frequency components of the reproduced FM signals. Actually, in an optical disc employing the CAV method, the high frequency correction is carried out only in reproducing the inner track, and the correction is not carried out in reproducing the central and outer peripheral portions. In an optical disc employing the CLV method, the same high frequency correction as carried out in reproducing inner track of the CAV disc is carried out for all the portions of the disc.

The selection of the amount of high frequency correction by the high frequency amplifying correcting circuit 43 is generally carried out in the following manner. A plurality of high frequency correcting amounts are stored in advance in an ROM (Read Only Memory), for example. The ROM stores the high frequency correcting amounts in the form of a table using the reproducing positions of the pickup 41 as addresses. The reproducing positions of the pickup 41 are detected by, for example, a position transducer to be converted into digital signals. In accordance with the digital converted information indicative of the reproducing position, the high frequency correcting amount is read from the ROM and the high frequency amplification of the reproduced signal is carried out by the read out amount of correction. The amount of high frequency correction is merely switched stepwise in accordance with the detected data of the reproducing position as shown by the dotted lines A, B in FIG. 15, for example. Therefore, it is very difficult to carry out optimal high frequency correction by delicately changing the amount of high frequency correction corresponding to the ever changing reproducing positions. In order to finely change the amount of high frequency correction corresponding to the reproducing positions, the capacity of the ROM storing the amounts of high frequency correction in the form of a table must be increased, which is not desirable from the point of cost.

Therefore, when the signal recording band is extended into the high frequency range and the influence of the high frequency degradation becomes apparent as in the case of the video disc record realizing extensive definition of images, the conventional high frequency correcting method is not effective.

SUMMARY OF THE INVENTION

An object of the present invention is to provide an improved reproducing circuitry of an optical disc player capable of extending the frequency range of reproduced signals.

Another object of the present invention is to provide a reproducing circuit of an optical video disc capable of extending the high frequency band which can be reproduced.

A further object of the present invention is to provide a reproducing circuitry of an optical video disc capable of reproducing high frequency components.

A still further object of the present invention is to provide a high frequency correcting circuitry in an optical disc player capable of correcting high frequency attenuation of reproduced video signals always in the best manner in correspondence with reproducing positions of the optical disc.

A still further object of the present invention is to provide a method of reproducing signals in an optical video disc capable of extending the high frequency range of reproduced video signals.

A still further object of the present invention is to provide a method of high frequency correction in an optical disc player capable of correcting high frequency components of reproduced video signals.

A still further object of the present invention is to provide a signal reproducing circuitry and a method of signal reproduction in an optical disc player capable of reproducing video signals having a substantially flat frequency characteristic over a wide frequency band.

A signal reproducing circuitry in accordance with the present invention comprises a circuitry for detecting a time difference between output signals from photo detectors provided in a preceding side and a succeeding side with respect to the proceeding direction of the pits, and a circuitry for adjusting a delay time of the output from the photo detector in the preceding side in response to an output from the time difference detector. The signal reproducing circuitry in accordance with the present invention further comprises a circuitry for amplifying and correcting high frequency components of reproduced video signals in response to the output from the time difference detector.

The time difference detector comprises a circuit for detecting phase difference or frequency difference between the outputs from the photo detectors.

The amplifying correcting circuitry comprises a circuit for correcting high frequency components of reproduced FM signals or FM demodulated signals from the photo detectors.

A method for reproducing signals in accordance with the present invention comprises the steps of detecting time difference between outputs from photo detectors provided in a preceding side and a succeeding side with respect to the proceeding direction of the pits and of adjusting delay time of an output signal from the photo detector in the preceding side in response to the detected time difference.

The method of reproducing signals in accordance with the present invention further comprises the step of correcting high frequency components of the signals reproduced from the optical disc in response to the detected time difference.

According to the present invention, the phase of the outputs from the photo detector in the preceding side and the phase of the outputs from the photo detector in the succeeding side can be always the same regardless of the reproducing position of the optical disc, and the diameter of the beam spot can be made ½ equivalently. Consequently, the frequency band of the reproduced FM signals can be extended.

Since the outputs of the time difference detector correspond to the reproducing positions on the optical disc, the high frequency components of the video signals can be corrected corresponding to the reproducing positions by adjusting the amount of correction of the reproduced video signals by the output from the time difference detector.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 3 shows one example of a schematic structure of a recording signal forming circuit for the optical disc;

FIGS. 4a–4e show waveforms of output signals from respective portions of the circuit shown in FIG. 3;

FIG. 5 shows a frequency spectrum of a recording FM signal of a currently used NTSC system laser vision disc;

FIG. 21 shows a frequency spectrum of a recording FM signal in the, EDTV system;

FIG. 22 shows a frequency spectrum of a recording FM signal in accordance with a widened EDTV system;

FIG. 28 is a block diagram showing a structure of a video signal reproducing circuit in accordance with a still further embodiment of the present invention;

DESCRIPTION OF THE PREFERRED EMBODIMENTS

Figure 1:
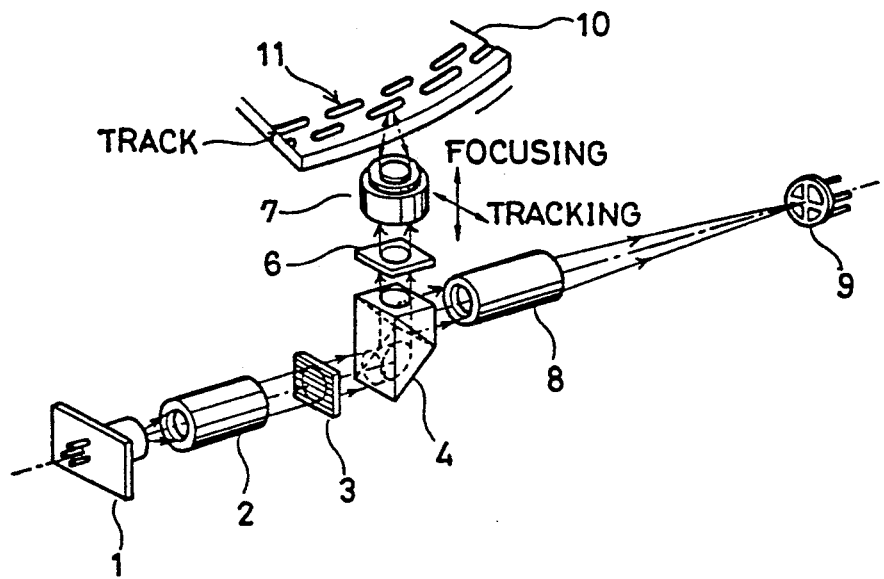
FIG. 1 shows a schematic structure of a pickup system of an optical disc.
Figure 2:
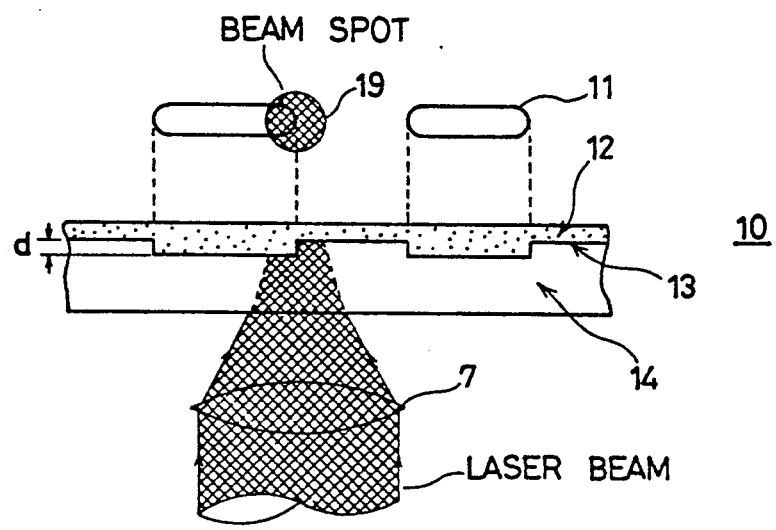
FIG. 2 schematically shows a cross sectional shape of an optical disc.

Embodiments of the present invention will be hereinafter described with reference to the figures. In the following, portions which are the same or corresponding to the prior art example are represented by the same reference characters and the description thereof will be appropriately omitted.

Figure 6:
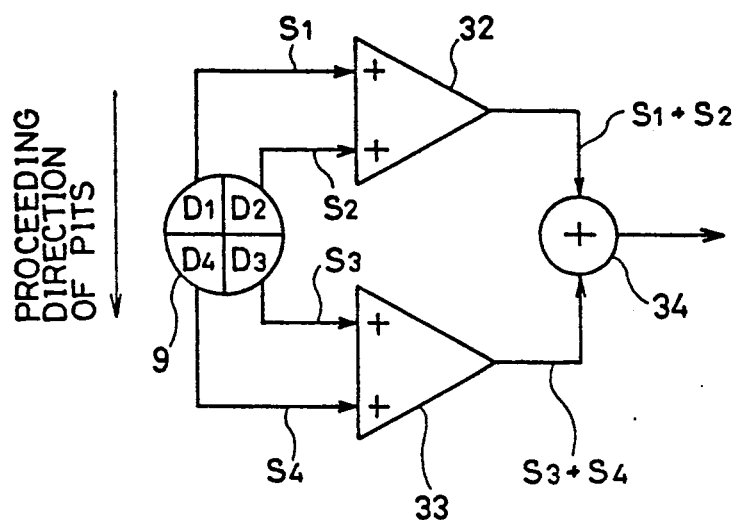
FIG. 6 shows one example of a conventional signal reproducing circuit.
Figure 7:
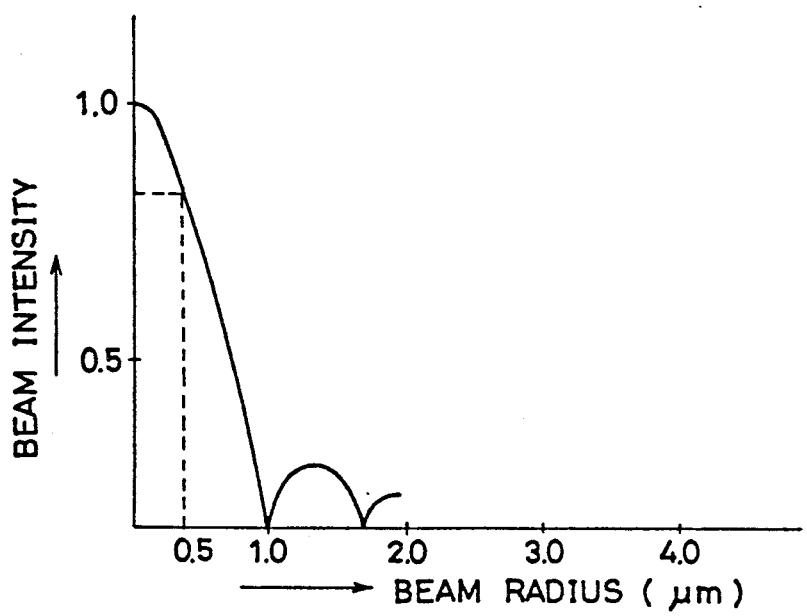
FIG. 7 shows intensity distribution of a laser beam projected on an optical disc as a function of the radius thereof.
Figure 8A:
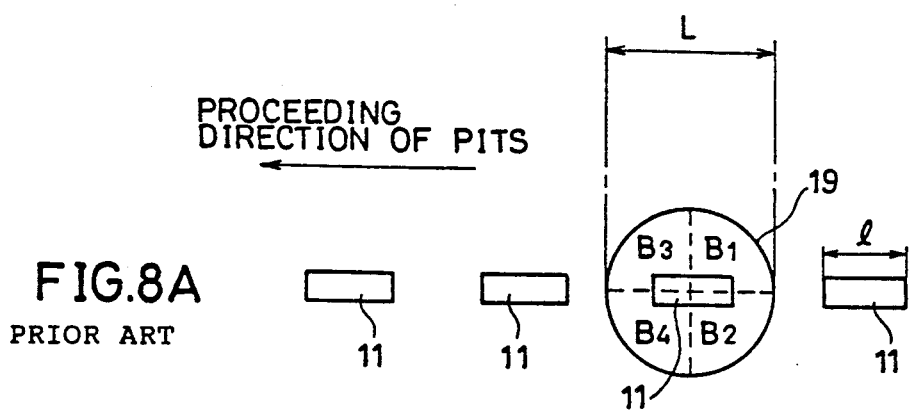
FIGS. 8A to 8C schematically show positional relation between a laser beam spot and pits on an optical disc.
Figure 8B:
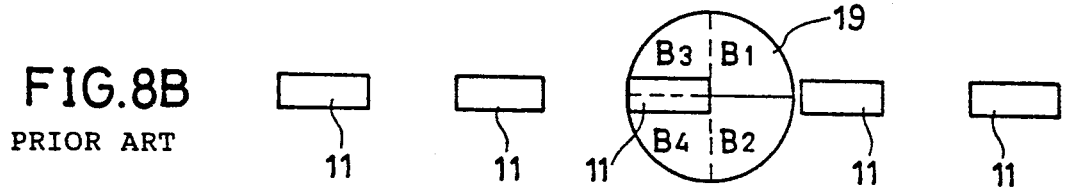
Figure 8C:
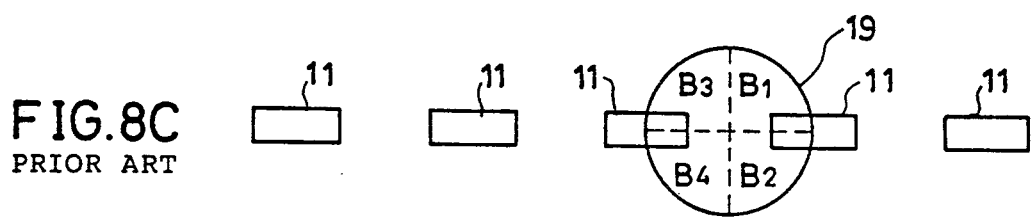
Figure 16:
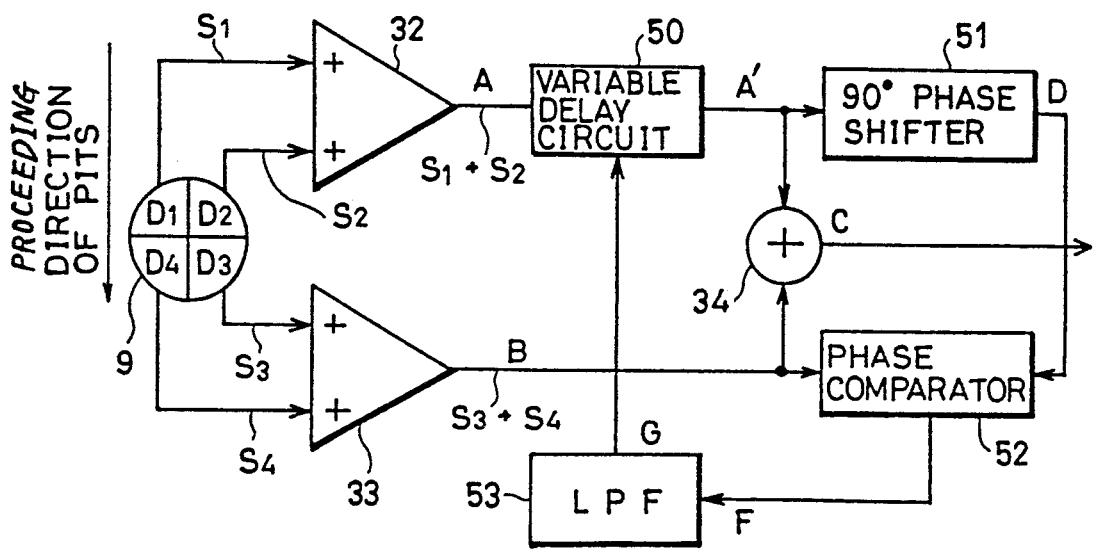
FIG. 16 is a block diagram showing a structure of a signal reproducing circuit in accordance with one embodiment of the present invention.
Figure 17:
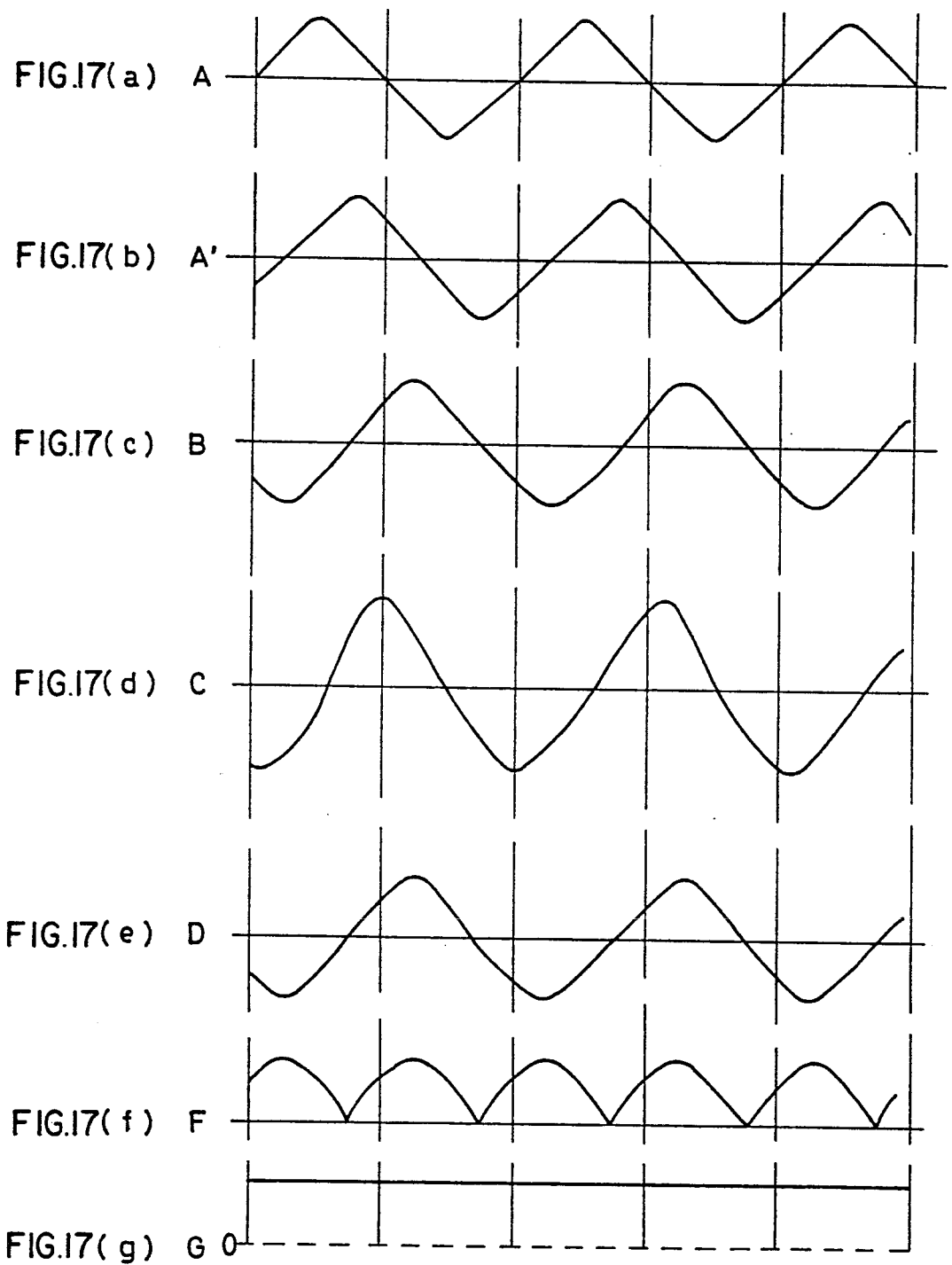
FIGS. 17a–17g show waveforms of output signals from respective portions of the circuit shown in FIG. 16.

Referring to FIG. 16, a signal reproducing circuit in accordance with one embodiment of the present invention comprises, in addition to the structure shown in FIG. 6, a variable delay circuit 50 receiving an output from the adder 32, a 90° phase shifter 51 receiving an output from the variable delay circuit 50, a phase comparator 52 for detecting phase difference between an output from the adder 33 and an output from the 90° phase shifter 51, and a low pass filter 53 for passing low frequency components of an output from the phase comparator 52 to apply the same to the variable delay circuit 50. The delay time of the variable delay circuit 50 can be continuously (in an analog manner) adjustable and is controlled by an output from the low pass filter 53. FIG. 17 shows waveforms of respective circuit output signals. The reference characters A to G in the FIG. 17 show signal waveforms at the points A to G in FIG. 16. The operation will be described in the following.

Photo electric converted signals S1 and S2 from the photoelectric converting elements D1 and D2 in the preceding side of the quadrant photo detector 9 are added in the adder 32 to be applied to the variable delay circuit 50. The variable delay circuit 50 delays the applied signal in the manner as will be described later and provide the same to the 90° phase shifter 51. The 90° phase shifter 51 shifts the phase of the given signal by 90° to apply the same to one input of the phase comparator 52. In general, the 90° phase shifter is used for comparing phases of the signals having the same frequency, and it is provided to enlarge the phase difference between the signals to be compared in order to ensure detection of the phase difference.

The photoelectric converted signals S3 and S4 from the photoelectric converting elements D3 and D4 from the succeeding side are added in the adder 33 to be applied to the other input of the phase comparator 52.

The phase comparator 52 detects, in an analog manner, the phase difference between the given signals and provides a signal indicative of the detected phase difference. The low pass filter 53 extracts lower frequency components of the phase difference detecting signal from the phase comparator 52 to apply the same to the variable delay circuit 50. Consequently, the change of the high frequency signal from the phase comparator 52 (the outputs S1 to S4 from the adders 32 and 33 are RF signals) are made moderate (due to an integrating operation of the low pass filter 53), and a signal corresponding to the phase difference is negatively fed back to the variable delay circuit 50. The variable delay circuit 50 changes the delay time in response to the signal from the low pass filter 53 so as to minimize the phase difference. Consequently, the output from the variable delay circuit 50 is kept at the same phase as that of the output from the adder 33. The output from the variable delay circuit 50 and the output from the adder 33 which have the same phase are added in the adder 34 to be output as the reproduced FM signal.

Figure 9:
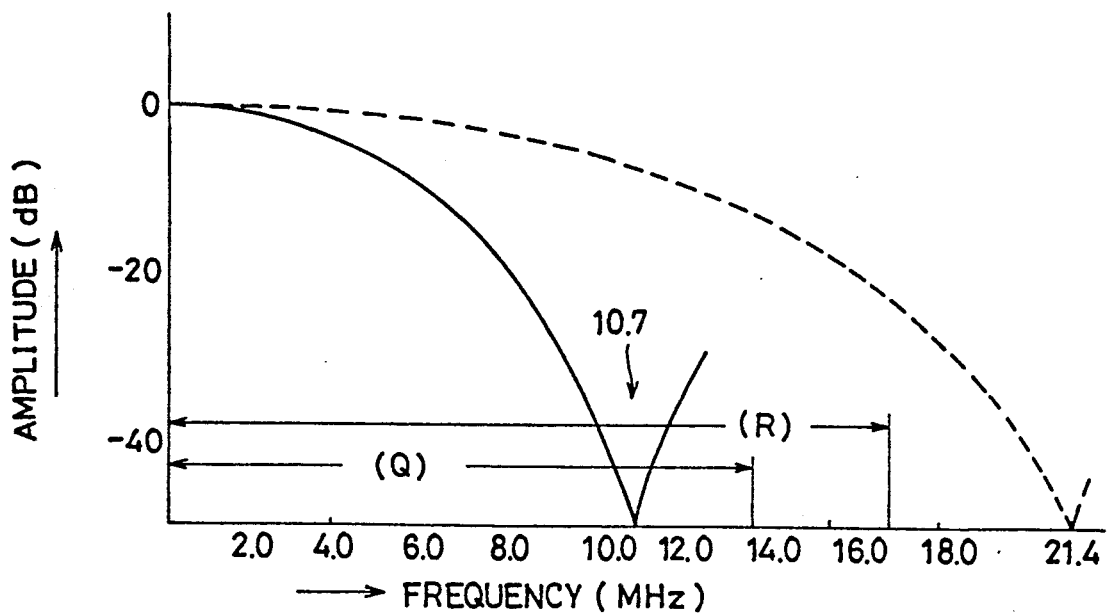
FIG. 9 shows a frequency characteristic of the reproduced FM signal.
Figure 10:
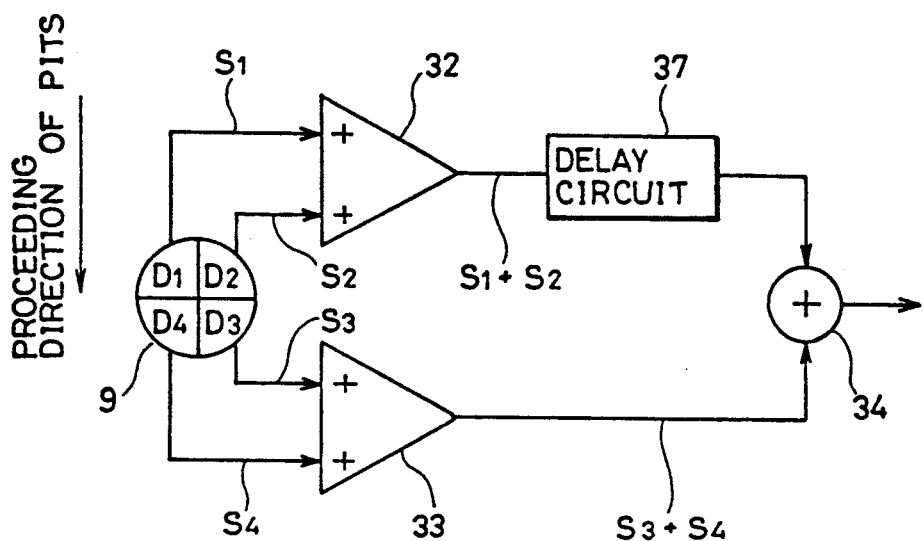
FIG. 10 shows another example of a conventional signal reproducing circuit.
Figure 11:
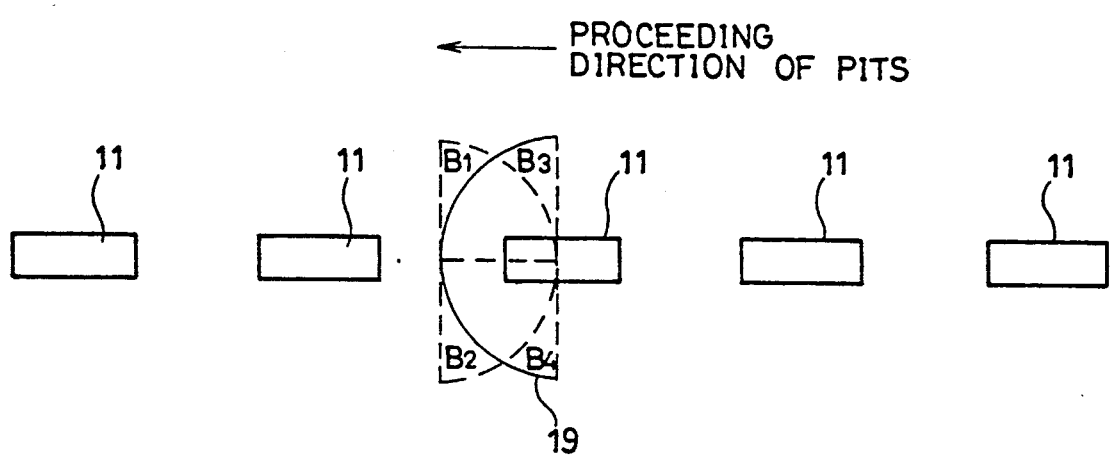
FIG. 11 shows a shape of a beam spot of the present invention viewed from the point of electrical signal processing.
Figure 12A:
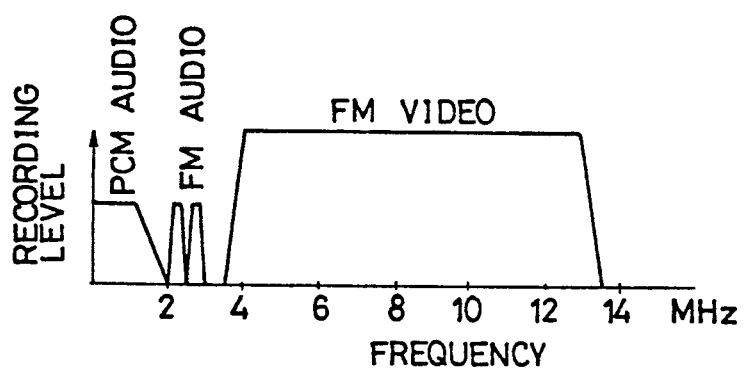
FIGS. 12A to 12D schematically show the frequency spectrum of recording/reproduced FM signals of a video disc record.
Figure 12B:
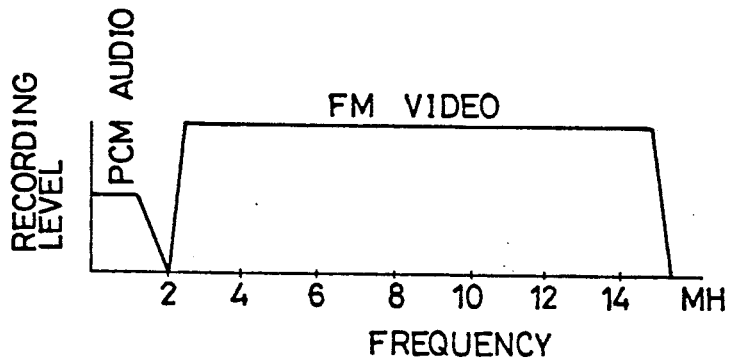
Figure 12C:
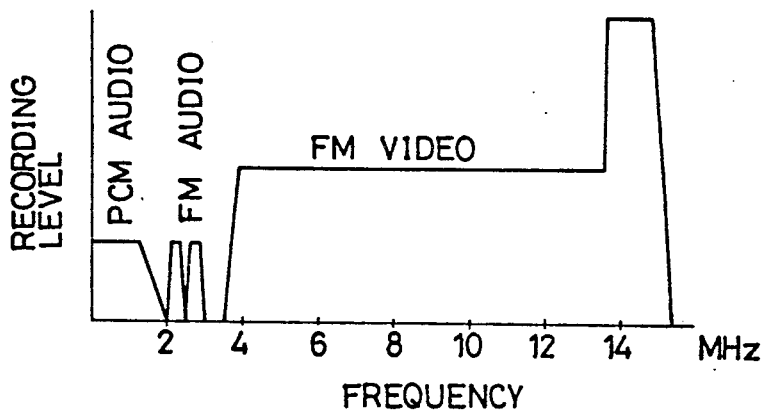
Figure 12D:
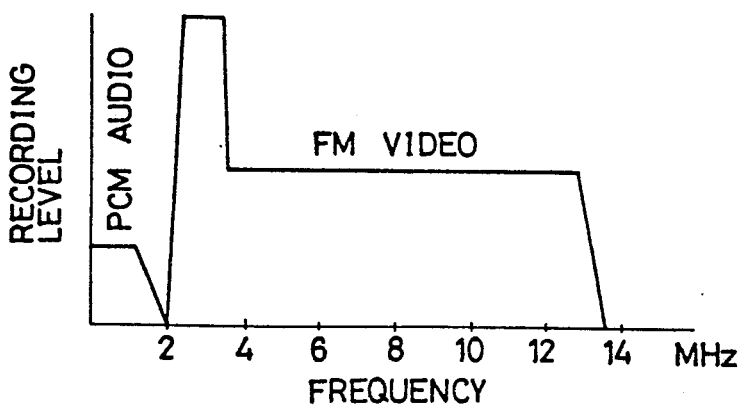
Figure 13:
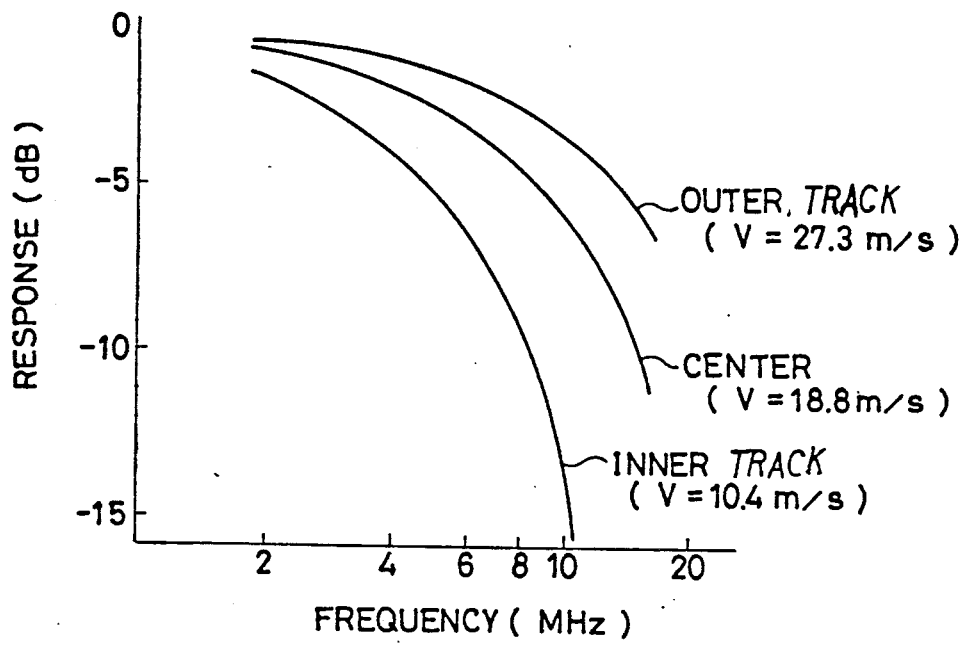
FIG. 13 shows a frequency characteristic of a reproduced FM signal of a video disc record employing the CAV method.
Figure 14:
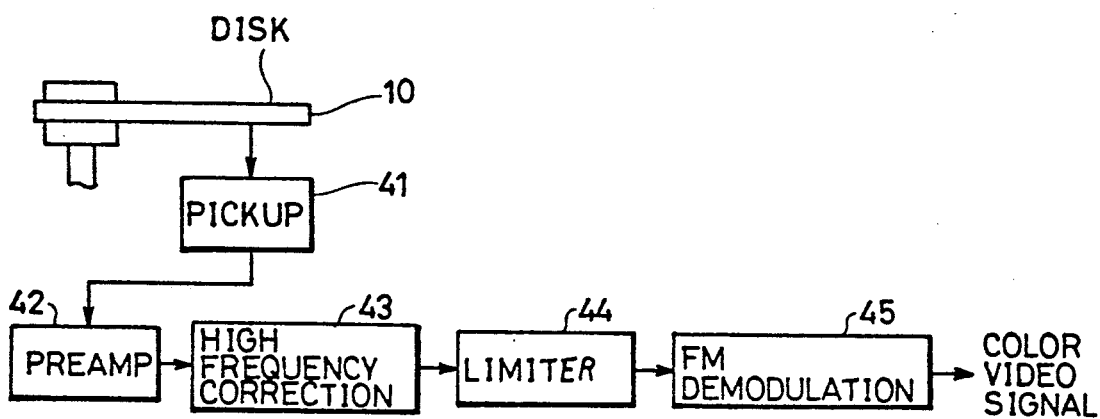
FIG. 14 is a block diagram schematically showing a structure of a conventional video signal reproducing circuit.
Figure 15:
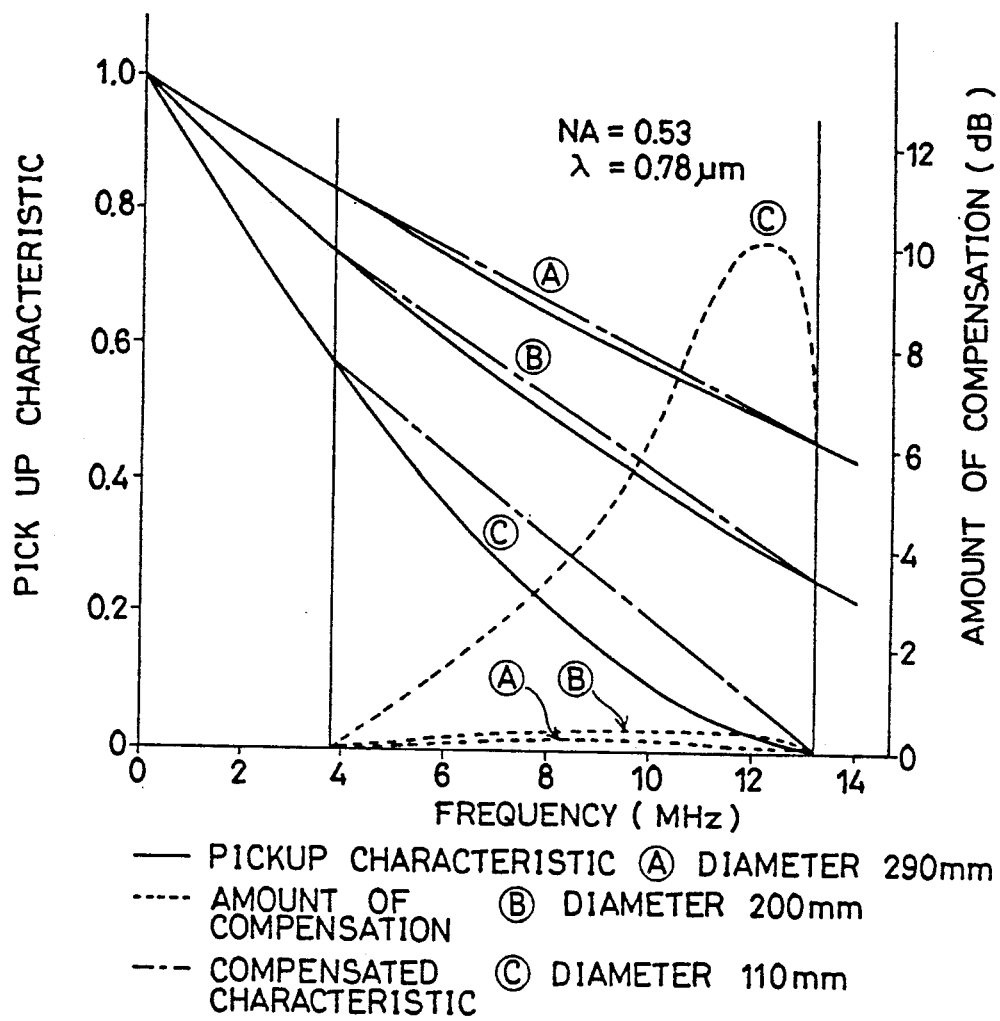
FIG. 15 shows a frequency characteristic of a conventional high frequency correcting circuit and frequency characteristics of input/output signals to and from the same.

By the above described structure, the equivalent relation between the beam spot 19 and the pit 11 for the electrical signal processing can be always set as shown in FIG. 11 regardless of the reproducing position of the optical disc and of the jitter in the servo system. More specifically, the equivalent beam spot diameter in an aspect of electrical signal processing can be always set to be ½ of the irradiating beam spot. The frequency characteristic of the reproduced signal when the beam spot diameter is 1.0 μm and the linear velocity of the optical disc is 10.7m/s is represented by a chain line in FIG. 9. In this case, the degradation of the high frequency component caused by the jitter in the servo system and by the movement of the 0 point is suppressed, so that the frequency characteristic in the high frequency range of the reproduced signal can be considerably improved.

Figure 18:
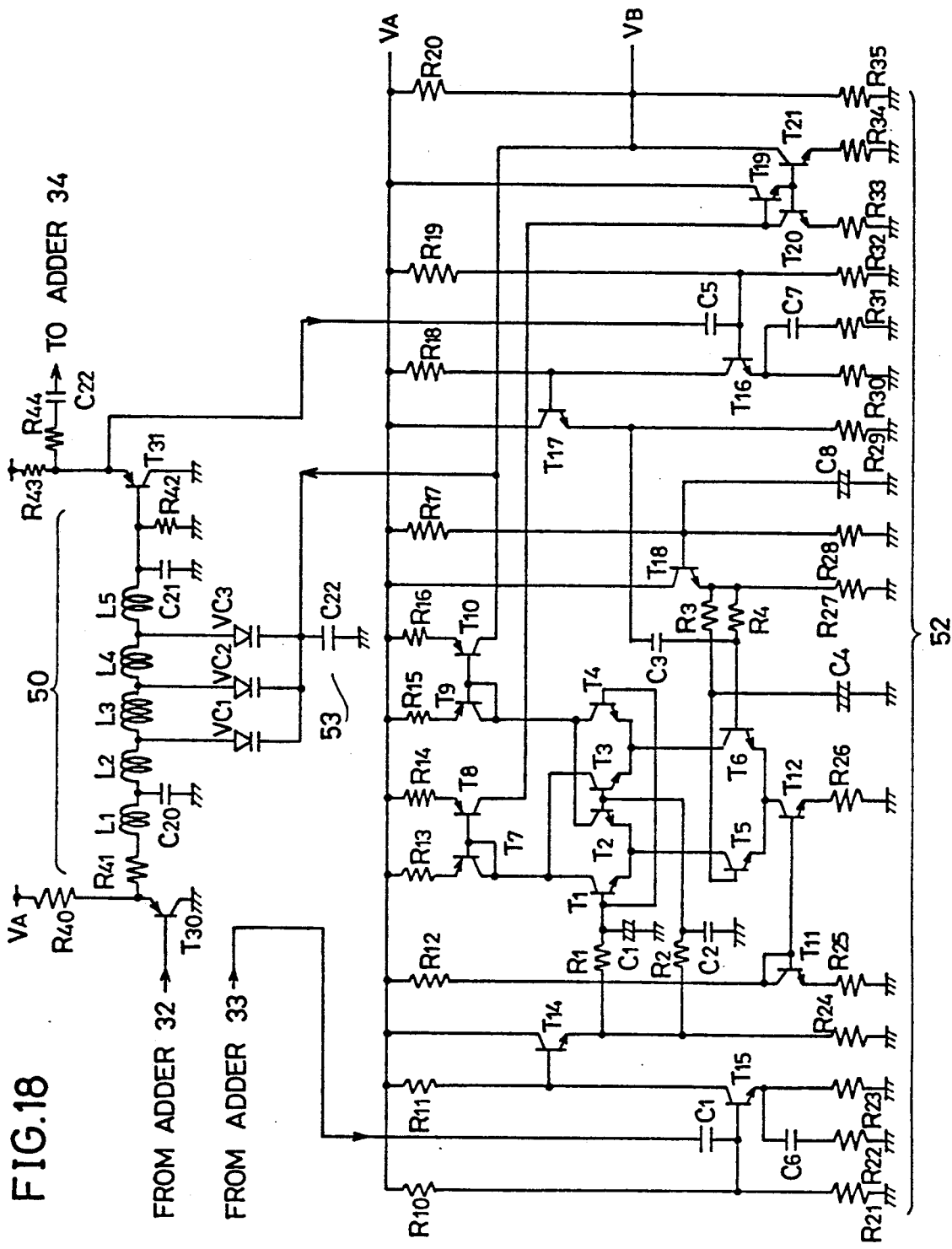
FIG. 18 is a schematic diagram showing examples of specific structures of a variable delay circuit, a low pass filter and a phase comparator of FIG. 16.

FIG. 18 shows one example of specific structures of the phase comparator 52 and the variable delay circuit 50. Referring to FIG. 18, the variable delay circuit 50 comprises coils L1, L2, L3, L4 and L5, capacitors C20 and C21 and variable capacitance diodes (varicap) VC1, VC2 and VC3. The coils L1 to L5, the capacitors C20 and C21 and the variable capacitance diodes VC1 to VC3 constitute five stages of LC delay line. The delay time of the LC delay line is determined by inductance of the coils and capacitance of the capacitors. The capacitande value of the variable capacitance diode is changed dependent on a voltage value applied to the cathode thereof.

The capacitor C22 adjusts the voltage applied to the cathode of the variable capacitance diodes VC1 to VC3 in response to uncompared output from the phase comparator 52. More specifically, the compared output from the phase comparator 52 is a current signal. The charging/discharging of the capacitor C22 in response to the current value controls the voltage applied to the cathode of the variable capacitance diodes VC1 to VC3 and output signals from the comparator 52 are made smooth, so that a direct voltage corresponding to the phase difference is applied to the variable capacitance diodes VC1 to VC3. A constant voltage $V_B$ is applied to the cathodes of the variable capacitance diodes VC1 to VC3 so as to bias the voltage applied to the variable capacitance diodes VC1 to VC3. Consequently, the capacitance value of the variable capacitance diodes VC1 to VC3 can be increased/decreased corresponding to the phase difference, and therefore the delay time of the variable delay circuit 50 can be increased/decreased. When the voltage applied to the cathode of the variable capacitance diodes VC1 to VC3 is the constant voltage $V_B$, the delay time is the prescribed delay time L/2.v (where v represents linear velocity at the inner track of the disc and L represents the beam spot diameter). When the applied voltage becomes larger than $V_B$, the capacitance value of the variable capacitance diodes VC1 to VC3 becomes smaller and the delay time becomes shorter than the prescribed value. When the applied voltage becomes smaller than $V_B$, the delay time becomes longer than the prescribed value.

Photoelectric converting signals S1+S2 from the adder 32 are applied to the delay line through a PNP transistor T30 in an input stage. The pnp transistor T30 has an emitter follower structure with the collector grounded, which transmits signals to the coil L1 of the delay line input stage through an output resistance R41.

An output from the delay line is transmitted to the adder 34 and the phase comparator 52 through a pnp transistor T31 of an output buffer. The pnp transistor T31 has the emitter follower structure with the collector grounded, whose emitter coupled to an input stage of the adder 34 through an output resistance R44 and a coupling capacitor C22. The resistances R40, R41 and R43, R44 bias emitter potentials of the pnp transistors T30 and T31, respectively.

The phase comparator circuit 52 comprises three pairs of npn transistors T1 and T2, T3 and T4, T5 and T6 which are connected to operate differentially. The transistor T1 has its collector connected to the collector of the transistor T3 and the transistor T2 has its collector connected to the collector of the transistor T4. The emitters of the transistors T1 and T2 are connected to each other while the emitters of the transistors T3 and T4 are connected to each other.

The emitters of the transistors T1 and T2 are connected to the collector of the transistor T5. The emitters of the transistors T3 and T4 are connected to the collector of the transistor T6.

The emitters of the transistors T5 and T6 are connected to a constant current circuit. The constant current circuit constitute a current mirror circuit comprising npn transistors T11 and T12 and resistances R25 and R26. The base and the collector of the transistor T11 are connected to each other. The transistor T11 has its collector connected to a constant potential $V_A$ through a bias resistance R12 and its emitter grounded through the resistance R25. The transistor T12 has its collector connected to the emitters of the transistors T5 and T6 and its emitter connected to the ground through the resistance R26. The same current flowing through the transistor T11 flows through the transistor T12.

The phase comparator 52 comprises, as two input stages, npn transistors T14, T15 and T16, T17 and T18. The transistors T15 and T14 are darlington-connected to form an amplifying stage. A photoelectric converted signal from the adder 33 is applied to the base of the transistor T15 through the coupling capacitance C1. A bias voltage is applied to the base of the transistor T15 by the resistances R10 and R21. A capacitor C6 and resistances R22 and R23 are connected to the emitter of the transistor T15. The capacitor C6 and the resistance R22 are connected in series. The capacitor C6, the resistance R22 and the resistance R23 are connected in parallel. The capacitor C6 and the resistances R22 and R23 define an emitter ground amplifying rate of the transistor T15.

An emitter output of the transistor T14 is transmitted to the bases of the transistors T1 and T4 through the resistance R1 and the capacitor C1 and is also transmitted to the bases of the transistors T2 and T3 through the resistance R2 and the capacitor C2. By the resistance R2 and the capacitor C2, the phase of the output signal from the adder 33 is delayed by 45°. The resistance R1 and the capacitor C1 apply a constant bias potential to the bases of the transistors T1 and T4 regardless of the output from the transistor T14.

The other input stage comprises npn transistors T16 and T17. The transistors T16 and T17 are darlington connected to form an amplifying stage. An output signal from the variable delay circuit 50 is applied to the base of the transistor T16 through a coupling capacitance C5. A capacitor C7 and resistances R30 and R31 are connected to the emitter of the transistor T16, and the emitter ground amplifying rate of the transistor T16 is determined by composite impedance of these elements. Resistances R19 and R20 are connected to the base of the transistor T16 to apply a base bias potential. An emitter output of the transistor T17 is transmitted to the base of the transistor T16 and to one end of the resistance R4 through a capacitor C3. The other end of the resistance R4 is connected to the emitter of the npn transistor T18 and to the ground through the resistance R27. A resistance R3 is connected to the emitter of the transistor T18 in parallel to the resistance R4. The transistor T18 has its emitter connected to the base of the transistor T5 through the resistance R3. The capacitor C4 is connected in parallel to the resistance R3 between the resistance R3 and the base of the transistor T5. The transistor T18 supplies a base current to the transistors T5 and T6. Bias resistances R17 and R28 and a bias capacitor C8 are connected to the base of the transistor T18. A phase shifting stage constituted by the capacitor C3 and the resistance R4 proceeds the phase of the output signal from the variable delay circuit 50 by 45°. A constant bias potential is applied to the base of the transistor T5 by the capacitor C4 and the resistance R3 regardless of the output from the capacitor C3.

An output stage of the comparator 52 comprises pnp transistors T7, T8, T10. The transistors T7 and T8 constitute a current mirror circuit. The collector of the diode connected transistor T7 is connected to the collectors of the transistors T1 and T3. The transistors T9 and T10 constitute a current mirror circuit. The collector of the diode connected transistor T9 is connected to the collectors of the transistors T2 and T4. A phase difference detecting signal is output from the collector of the transistor T10.

Each of the current mirror circuits constituted by the transistors T7 and T8 and T9 and T10 are further connected to a current mirror type constant current circuit. The current mirror type constant current circuit comprises npn transistors T19, T20 and T21. The transistor T19 has its base connected to the collector of the transistor T20 and its emitter connected to the bases of the transistors T20 and T21. The transistor T20 has its collector connected to the collector of the transistor T8. The transistor T21 has its collector connected to the collector of the transistor T10. Since the same bias is always applied to the bases of the transistors T20 and T21 by the transistor T19, the emitter currents from the transistors T20 and T21 have the same value. The operation will be briefly described in the following.

An output signal from the variable delay circuit 50 and a signal from the adder 33 are respectively amplified by the transistors T16, T17 and the transistors T15 and T14 and thereafter applied to the phase shifting stage and the phase detecting stage. Either the transistor T5 or T6 is turned on in response to the output signal from the variable delay circuit 50. Similarly, either the pair of transistors T1 and T4 or the pair of transistors T2 and T3 are turned on. A collector current flows through the transistor T10 only when the transistors T4 and T6 or the transistors T2 and T5 are simultaneously turned on. The collector current of the transistor T10 charges the capacitor C22 to raise the potential of the capacitor 22. The time period during which the collector current flows corresponds to the phase difference of the signals to be compared applied to the transistor T6 and to the transistors T2 and T3, respectively. Therefore, as the phase difference becomes smaller than 90°, the amount of current applied to the capacitor C22 is increased, and the potential of the capacitor C22 becomes higher. Consequently, the capacitance values of the variable capacitance diodes VC1 to VC3 become smaller and the delay time of the variable delay circuit 50 becomes shorter.

The collector current flows through the transistor T8 only when the transistors T1 and T5 or the transistors T3 and T6 are simultaneously turned on. The collector current of the transistor T8 flows through the transistor T20. Since the transistors T20 and T21 form a current mirror circuit, the same current flowing through the transistor T20 (T8) flows through the transistor T21. The current flowing through the transistor T21 is applied from the capacitor C22. Consequently, the potential of the capacitor C22 is lowered due to the discharge, the capacitance values of the variable capacitance diodes VC1 to VC 3 are increased and the delay time of the variable delay circuit 50 becomes longer.

The transistors T8 and T10 provides collector current alternatively. The time period during which the transistors T8 and T10 supply the collector current is determined by the phase difference between the signals to be compared. More specifically, when the phase difference between the output of the 90° phase shifter 51 and the output of the adder 33 is 90°, then the on time of the transistor T8 becomes the same as that of the transistor T10. If the phase difference becomes smaller than 90°, then the on time of the transistor T10 becomes longer than that of the transistor T18. Consequently, when the phase difference between the output of the 90° phase shifter 51 and the output of the adder 33 becomes smaller than 90°, the delay time of the variable delay circuit 50 becomes shorter, and the delay time become longer when the phase difference becomes larger than 90°. Accordingly, the phase difference between the output of the phase shifter 51 and the output from the adder 33 can be always kept at 90°. The 90° phase shifter 51 comprises a 45° phase shifting stage constituted by the resistance R2 and the capacitor C2 and a phase shifting stage constituted by the resistance R4 and the capacitor C3.

Therefore, when the phase of the output signal from the variable delay circuit 50 precedes the phase of the output signal from the adder 33, that is, when the delay time of the variable delay circuit 50 is shorter than the desired value, then the difference between the phase of the output signal from the 90° phase shifter 51 and the phase of the output signal from the adder 33 becomes larger than 90°, and the delay time of the variable delay circuit 50 is increased by the phase comparator 52. The delay time is shortened in the reverse case.

For an optical disc employing the CAV method, the linear velocity becomes smaller when the disc reproducing positions comes near the inner track, and the output phase difference between the adders 32 and 33 becomes larger at the inner track of the disc. Accordingly, the delay time of the variable delay circuit 50 must be made smaller near the outer track of the disc. In that case, the phase of the output signal of the variable delay circuit 50 tends to be delayed from the phase of the output signal from the adder circuit 33 near the outer track of the disc, so that the phase difference between the output from the 90° phase shifter 51 and the output from the adder 33 becomes smaller than 90°, and the delay time is shortened by the phase comparator 52. Consequently, the delay time of the variable delay circuit 50 can be shortened from the inner track to the outer track of the disc in playing an optical disc employing the CAV method. The charge potential of the capacitor C22 of the variable delay circuit 50 becomes higher toward the outer track of the disc.

By the above described structure, the phase of the output signal from the variable delay circuit 50 can be always made the same as that of the output signal from the adder 33 in the succeeding side, thereby extending the high frequency range of the reproduced signal.

Figure 19:
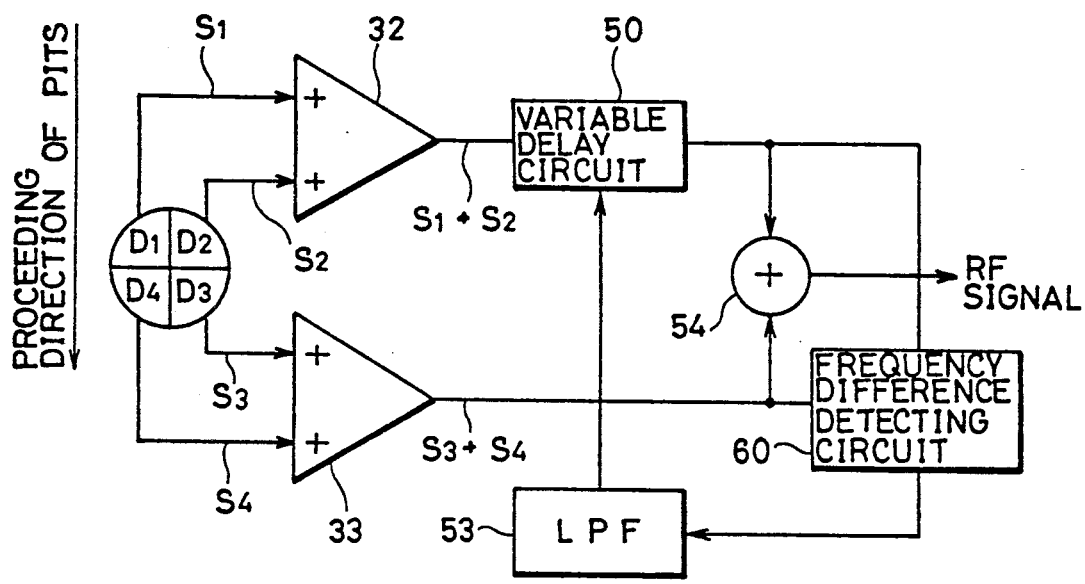
FIG. 19 is a block diagram showing a structure of a signal reproducing circuit in accordance with another embodiment of the present invention.

Although the delay time of the output signals S1+S2 of the photoelectric converting elements in the preceding side is controlled by detecting phase difference between the signals in the above described embodiment, the delay time may be controlled by detecting frequency difference between the signals as shown in FIG. 19. More specifically, since the output signals from the photoelectric converting elements D1 to D4 are FM signals, by detecting frequency difference between the outputs S3 +S4 from the adder 33 in the succeeding side and the output signal from the variable delay circuit 50 by means of a frequency difference detecting circuit 60, the time difference between both output signals can be detected. Therefore by adjusting the delay time of the variable delay circuit 50 utilizing the frequency difference detecting signal as a control signal, the time difference between the output of the photoelectric converting element in the preceding side and the output from the photoelectric converting elements in the succeeding side can be made 0.

Figure 20:
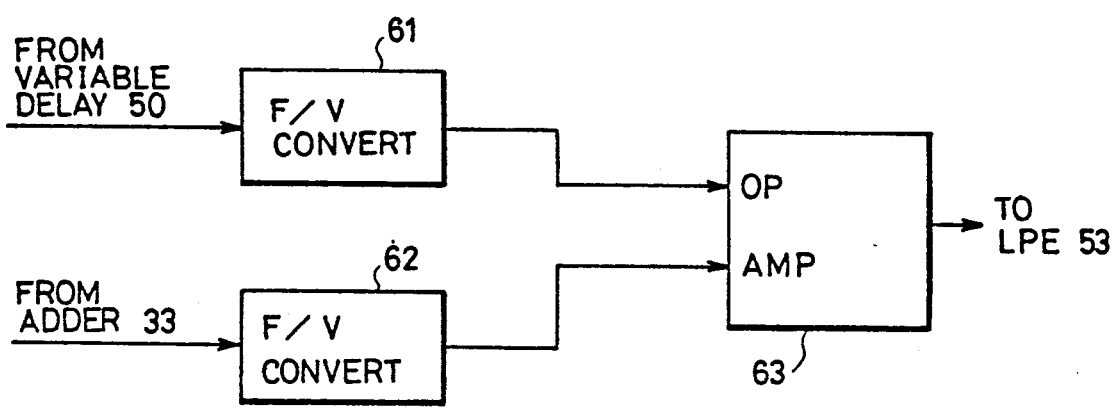
FIG. 20 shows an example of a structure of a frequency difference detecting circuit shown in FIG. 19.

FIG. 20 shows one example of a specific structure of the frequency difference detecting circuit. Referring to FIG. 20, the frequency difference detecting circuit 60 comprises a frequency-voltage converter 61 which receives a signal from the variable delay circuit 50 to convert the frequency of the received signal into a voltage signal, a frequency-voltage converting circuit 62 which converts the frequency of a signal from the adder 33 into a voltage signal and an amplifier 63 which detects and amplifies a difference between the signal voltages from the frequency-voltage converters 61 and 62. The amplifier 63 is constituted by, for example, an operational amplifier, which provides a signal equal to the signal voltage difference between the converters 61 and 62 to apply the same to a low pass filter 53.

By the above described structure, the 0 point in the frequency characteristic of the reproduced signal can be shifted to a high frequency range and the modulation of the high frequency components caused by the fluctuation of this 0 point can be suppressed. Consequently, the degradation of the high frequency components of the reproduced signals can be prevented and the frequency range employed can be extended.

The above described signal reproducing circuit can be effectively applied in playing a video disc of the EDTV (extended definition TV) system realizing images of extended definition.

FIG. 21 shows a frequency spectrum of a recording signal of the EDTV system laser vision optical disc. The band width of the video signals of the EDTV system is extended from the currently used 4.2 MHz (of the NTSC system) to 6 MHz. Video signals are recorded on the optical disc by FM modulating carrier wave of 8.1 MHz. EFM modulated audio signals are recorded in the lower range. The frequency band employed for the video signals ranges from about 2.1 to 13.8 MHz.

Besides the above described EDTV system, a widened EDTV system has been known as a system realizing extensively defined images, in which aspect ratio is changed from currently employed 4:3 to 5:3 to widen a screen. A frequency spectrum of the recording signal in the widened EDTV system is shown in FIG. 22.

The video signal band of the EDTV systems was 6 MHz while the video signal band in the widened EDTV system is extended to 7.5 MHz, which is 5/4 times wider than that of the EDTV system. The recording video signal is provided by FM modulating the carrier wave frequency 9.3 MHz by the video signal. The FM modulation of the video signal is carried out such that sync tip becomes 8.6 MHz and the white peak becomes 10.3 MHz. The employed frequency band of the recording video signal ranges from about 2.2 to 16.8 MHz, in which deviation range and upper and lower chroma side bands are recorded.

Even if the recording signal frequency band is extended in order to extensively define images, the present invention is effective, since the critical frequency for reproduction (0 point) can be set at 21.4 MHz (when the beam spot diameter is 1 μm).

However, although the above described signal reproducing circuit is capable of reproducing high frequency components, the degradation of the high frequency characteristic of the reproduced signals is unavoidable as shown in FIG. 11. Therefore, high frequency correction of the reproduced signals is necessary.

Figure 23:
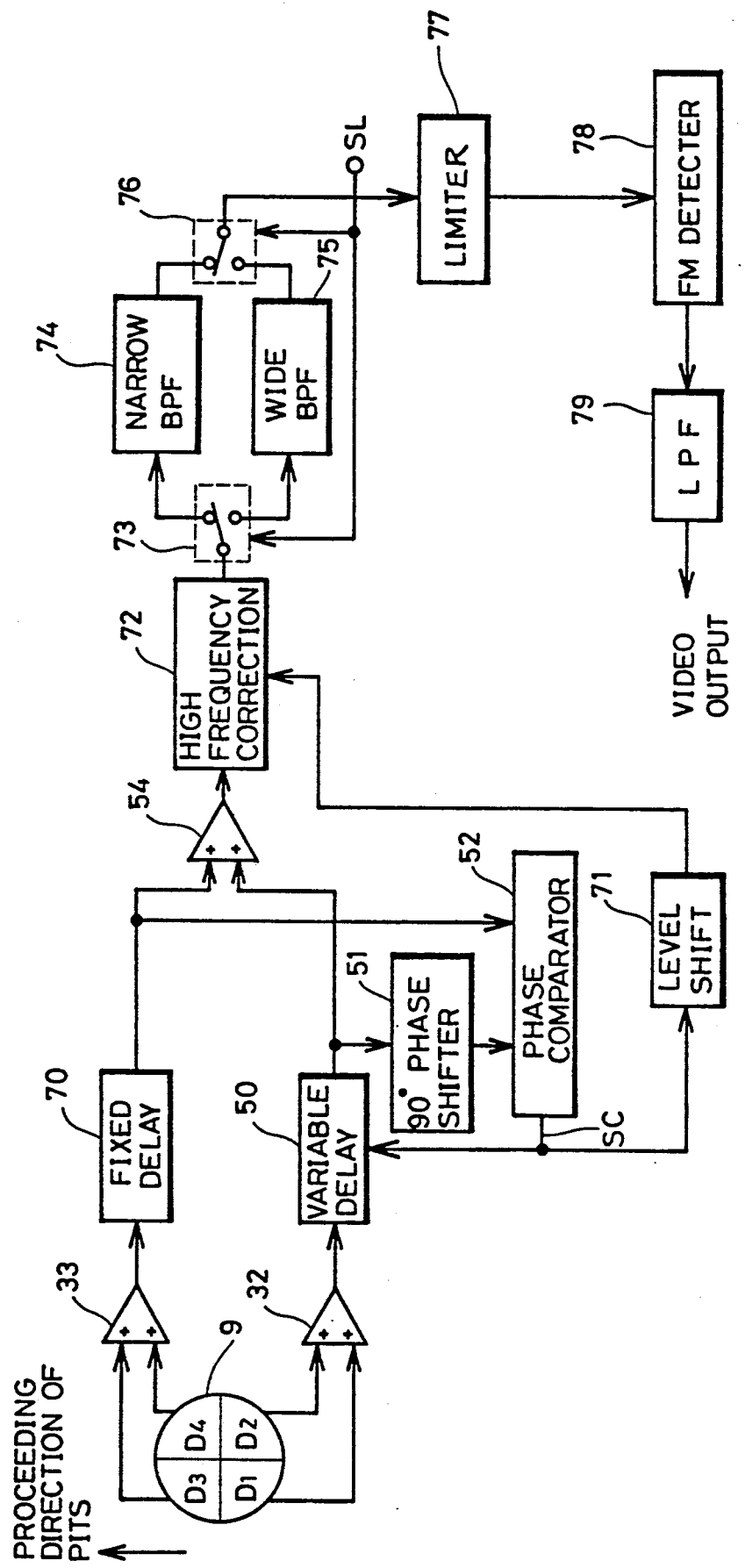
FIG. 23 is a block diagram showing a structure of a video signal reproducing circuit in accordance with a further embodiment of the present invention.

FIG. 23 shows a block diagram of a circuit structure for carrying out the high frequency correction in accordance with the present invention. In FIG. 23, portions corresponding to the circuit structure of FIG. 16 are represented by the same reference numbers.

Referring to FIG. 23, a fixed delay circuit 70 which delays an output signal from the adder 33 by a prescribed fixed time period is provided in order to correct an offset of a control range derived from a minimum delay time of the variable delay circuit 50. The fixed delay circuit 70 may not necessary be provided, as shown in the structure of FIG. 16.

A circuitry which provides video signals from reproduced FM signals (RF signals) from the adder 54 comprises a high frequency correcting circuit 72 for carrying out high frequency correction of the reproduced FM signals from the adder 54 and a level shifter 71 for controlling the amount of high frequency correction of the high frequency collecting circuit 72 in response to a phase difference detecting signal SC from the phase comparator circuit 52.

The video signal reproducing circuit further comprises a narrow band pass filter 74 and a wide band pass filter 75 for receiving outputs from the high frequency correcting circuit 72, a limiter 77 which receives an output signal from one of the band pass filters 74 and 75 to control the amplitude thereof, an FM detector 78 which receives a signal from the limiter 77 for FM detection, and low pass filter 76 which passes prescribed low frequency components of the output from the FM detector 78. Switches 73 and 76 are further provided which select either the band pass filter 74 or 75 in response to an externally applied selecting signal SL.

The level shifter 71 outputs a signal having such a voltage level that sets the amount of high frequency correction of the high frequency correcting circuit 72 at the appropriate value in response to the phase difference detecting signal SC from the phase comparator 52. When as the phase difference detecting signal SC is employed the charge potential of the capacitor C22 of the variable delay circuit 50, the level of the signal SC becomes lower near the inner track of the disc, if the optical disc employs the CAV method. Such a level shifter can be easily formed by a transistor having an emitter follower structure.

When the voltage level of the output control signal SC of the level shifter 71 changes in the similar manner as the delay time of the variable delay circuit 50, that is, when the voltage level of the output control signal SC is increased in playing the inner track of the optical disc employing the CAV method, then the level shifter 71 has an inverter structure, and the lower the voltage level of the control signal SC, the higher becomes the output level thereof. Such a level shifter can be easily formed by a collector follower type transistor.

As described above, the degree of degradation of the higher frequency components of the reproduced FM signals, which are the output from the adder 54 changes in correspondence with the position in the radial direction in playing optical disc employing the CAV method. The degree of degradation of the higher frequency components of the signals changes over all the portions in playing an optical disc employing the CLV method. The high frequency correcting circuit 12 compensates for the degradation of the high frequency components in response to the output from the level shifter 71.

Figure 24:
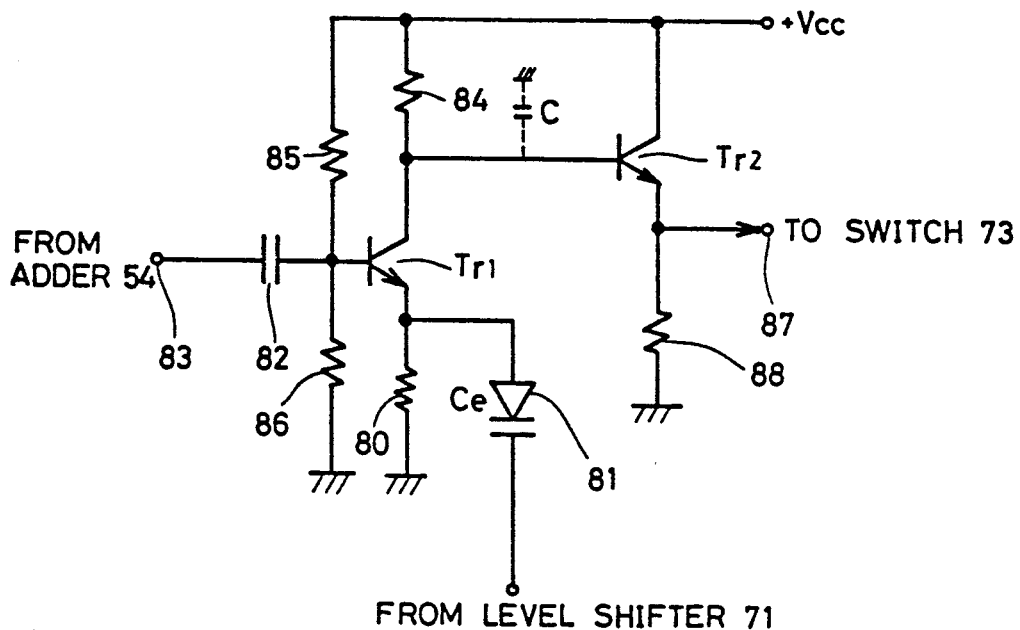
FIG. 24 shows one example of a specific structure of a high frequency correcting circuit shown in FIG. 23.

One example of the specific structure of the high frequency correcting circuit 72 is shown in FIG. 24. Referring to FIG. 24, the high frequency correcting circuit 72 comprises an npn transistor Tr1 for amplifying only the high frequency components and an npn transistor Tr2 for output.

A resistance 80 having a resistance value of R and an anode of a variable capacitance diode 81 are connected to the emitter of the transistor Tr1. The resistance 80 and the variable capacitance diode 81 are connected in parallel. A control voltage from the level shifter 71 is applied to the cathode of the variable capacitance diode 81. A reproduced FM signal from the adder 54 is applied to the base of the transistor Tr1 through a coupling capacitance 82. The coupling capacitance 82 passes only the reproduced FM signals applied through an input terminal 83. The collector of the transistor Tr1 is connected to the base of the transistor Tr2 and to a supply potential +Vcc through a resistance 84 having a resistance value of Rc. A bias potential is applied to the base of the transistor Tr1 by the resistances 85 and 86. The bias potential is applied by a resistance ratio of the resistances 85 and 86.

The transistor Tr2 for output has its emitter connected to an output terminal 87 and to the ground through a bias resistance 88. The transistor Tr2 has its collector connected to a supply potential +Vcc. The circuit shown in FIG. 24 is an implementation of a so-called emitter peaking method, in which the negative feed back ratio of the high frequency components is reduced by the variable capacitance diode 81 so as to compensate for the higher frequency components. The operation of the circuit will be hereinafter described.

There is inevitably a parasitic capacitance C derived from interconnection capacitances and so on at the collector of the transistor Tr1. When the output signal from the level shifter 71 is applied to the cathode of the variable capacitance diode 81, the electrostatic capacitance Ce of the variable capacitance diode 81 is determined by the voltage level of the output signal. On this occasion, the load impedance Zc of the collector of the transistor Tr1 is a parallel impedance of the resistance 84 and the parasitic capacitance C, which is determined by the resistance value Rc of the resistance 84 and the capacitance value (c) of the parasitic capacitance. The impedance Ze connected to the emitter of the transistor Tr1 is determined by the resistance value Re of the resistance 80 and the electrostatic capacitance of the variable capacitance diode 81. When the condition Zc/Ze+constant is satisfied by adjusting the electrostatic capacitance Ce of the variable capacitance diode 81, the voltage gain of the transistor Tr1 can be made constant, and the decrease of the voltage gain int he high frequency range can be compensated for. In other words, if the resistance values Re, Rc and the capacitance value Ce are set at appropriate values, the emitter peaking frequency characteristics by the transistor Tr1 such as shown in FIG. 25 can be provided.

Figure 25:
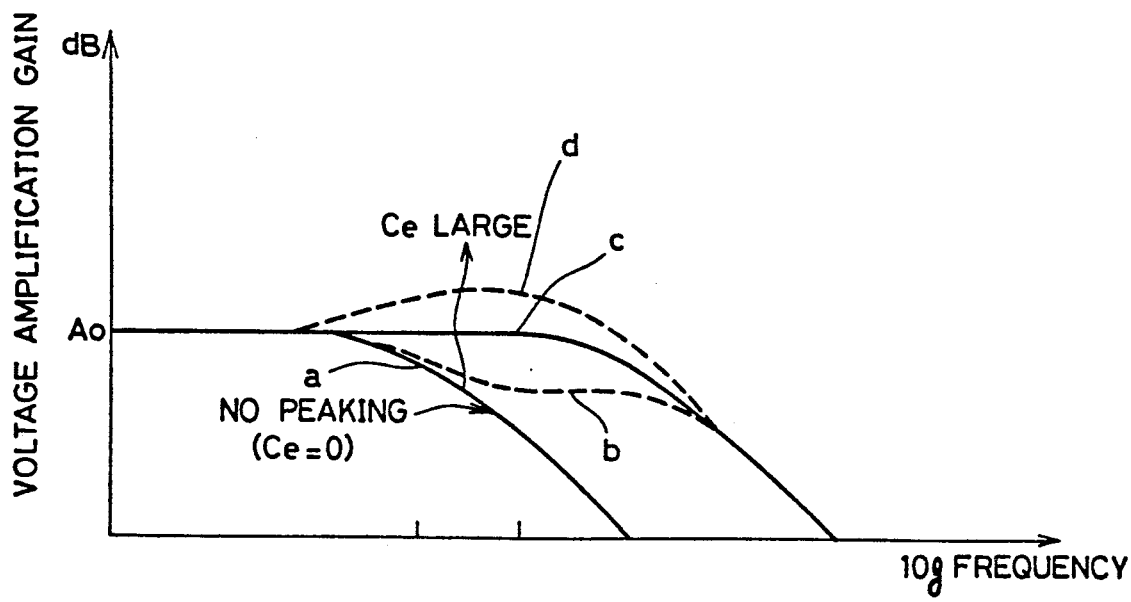
FIG. 25 shows a frequency characteristic of the high frequency correcting circuit of FIG. 24.

Referring to FIG. 25, the solid line (a) shows a frequency characteristic with no peaking where Ce=0. When the capacitance value Ce is gradually increased from this state, the peaking effect appears as shown by the dotted line (b), and a flat frequency characteristic can be provided as shown by the solid line (c) when Rcc=ReCe. When the capacitance value Ce is further increased, the high frequency components is over compensated as shown by the dotted line (d), the level of the high frequency component becomes high, and a peak can be generated in the higher frequency range.

Therefore, by changing the voltage level of the output signal from the level shifter 71 and by changing the capacitance value of the variable capacitance diode 81, only the high frequency components of the reproduced FM signals applied to the base of the transistor Tr1 can be amplified.

The output voltage level of the level shifter 71 becomes lower in playing inner track of the optical disc and becomes higher in playing outer track of the optical disc employing the CAV method. The output voltage level of the level shifter 71 in playing an optical disc employing the CLV method is approximately the same as that in reproducing the inner track of the optical disc of the CAV method, over the entire range of the disc.

when a signal of a low voltage level is applied to the cathode of the variable capacitance diode 81 from the level shifter 71, the latent electrostatic capacitance Ce becomes large. The level of the high frequency components of the reproduced FM signals become higher as shown by the dotted line (d) in the frequency characteristic curve shown in FIG. 25. Consequently, the amount of correction of the high frequency components at the disc inner track (of the optical disc employing the CAV method), at which the degradation of the high frequency components at the RF stage (high frequency signal processing state) is serious, becomes larger compared with that at the outer track of the disc. As the position of reproduction proceeds from the inner track to the outer track of the disc, the output signal level of the level shifter gradually becomes larger, and the amount of correction of the high frequency becomes gradually smaller, accordingly.

When he reproducing position is at the outermost periphery of the disc, the frequency characteristic becomes approximately flat as shown by the solid line (c) of FIG. 25. In playing an optical disc employing the CLV method, the amount of correction is approximately the same as that in playing the inner track of the optical disc employing eh CAV method for the entire range of the disc.

The reproduced FM signals which have been high frequency corrected by the high frequency correcting circuit 72 are transmitted either to the narrow band pass filter 74 or the wide band pass filter 75 where only the prescribed band component are extracted. Thereafter, the reproduced FM signals comprising the prescribed band components are transmitted to the limiter 77 through the switch 76.

The narrow band pass filter 74 extracts reproduced FM signals of presently available optical video disc record LD, whose recording/reproducing frequency spectrum is shown in FIG. 5. The wide band pass filter 75 extracts reproduced FM signals from an extended definition laser vision disc record (EDLD) whose frequency spectrum is shown in FIGS. 21, 22, and so on.

The switches 73 and 76 select either one of the band pass filters 74 and 75 in accordance with a switching signal SL applied from a system control circuit (not shown). When the video disc record to be played is an LD) the narrow band pass filter 74 is selected, and when the video disc record to be played is an EDLD, the wide band pass filter 75 is selected.

The limiter 77 limits the amplitude of the reproduced FM signals, and respective frequency components are symmetrically averaged with the video signal carrier being the center.

The output signal from the limiter 77 is FM detected by the FM detector 78 to be applied to the low pass filter 79. The low pass filter 79 has its cut off frequency set such that only the video signals of the base band are passed therethrough. The video signals of the base band which are FM demodulated by the low pass filter 79 are outputted.

FIGS. 26A to 26D and 27A to 27D show frequency spectra of output signals from various circuits shown in FIG. 23 in playing a video disc employing the CAV method. FIGS. 26A to 26D show respective frequency spectra in playing inner track of the disc and FIGS. 27A to 27D show frequency spectra in playing outer track of the disc.

Figure 26A:
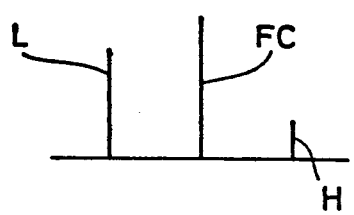
FIGS. 26A to 26D schematically show frequency spectra of output signals from respective portions of the circuit shown in a FIG. 23 in playing inner track of a CAV optical disc.
Figure 26B:
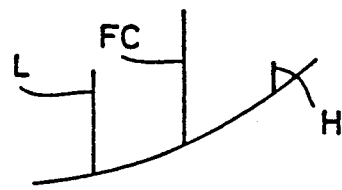
Figure 26C:
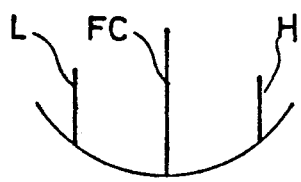
Figure 26D:
Figure 27A:
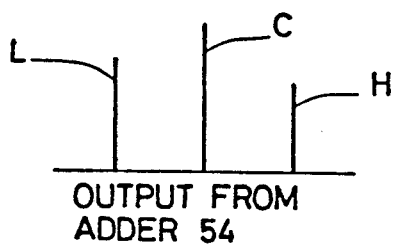
FIGS. 27A to 27D show frequency spectra of output signals from respective portions of the circuit shown in FIG. 23 in a playing outer track of the CAV optical disc.
Figure 27B:
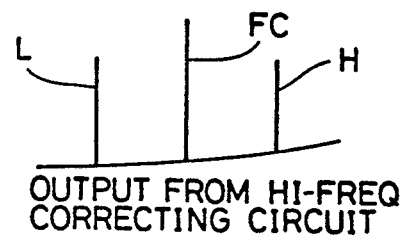
Figure 27C:
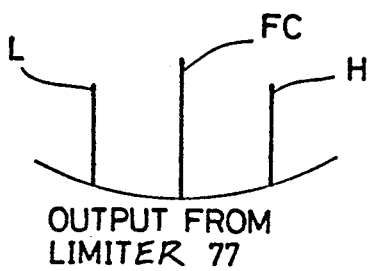
Figure 27D:

FIGS. 26A and 27A show the respective frequency spectra of the output signal from the adder 54 whose delay is corrected; FIGS. 26B and 27B show respective frequency spectra of the output from the high frequency correcting circuit 72 which is corrected in high frequency; FIGS. 26C and 27C show respective frequency spectra of the output from the limiter 77; and FIGS. 26D and 27D show respective frequency spectra of the output from the FM detector 78. In FIGS. 26A to 27D, the reference characters FC represents a video carrier component, L represents lower side band component and H represents upper side band component.

When FIGS. 26A and 27A are compared, it is noted that the degradation of the upper side H is more apparent in the playing inner track of the disc. When we compare FIGS. 26B and 27B, the amount of correction of the high frequency components is larger in playing the inner track of the disc, and the upper side band in playing the inner track and the outer track of the disc have approximately the same level.

Referring to FIGS. 26C and 27C, the upper and lower side band components H and L of the reproduced FM signals which have been corrected in high frequency are averaged to have approximately the same level with the video carrier FC being the center.

Referring to FIGS. 26D and 27D, a base band video signal is output whose degree of degradation in the higher frequency range is seen considerably improved.

Although high frequency correction of the reproduced FM signals is carried in the above embodiment, the high frequency correction may be directly carried out on the video signals of the base band, as an example of a structure for that case shown in FIG. 28. In the structure of FIG. 28, different from the structure of FIG. 23, the high frequency correcting circuit 72' is provided in the succeeding stage of the low pass filter 79. In the structure of FIG. 28, the high frequency correcting circuit 72' carries out high frequency correction not on the reproduced FM signals (RF signal) but on the video signals of the base band. The high frequency corrected base band video signals are output from the high frequency correcting circuit 72'.

The high frequency correcting circuit 72' has substantially the same structure as that of FIG. 24 except that an output from the low pass filter 79 is applied to the input terminal 83 and that the capacitor 82 is omitted.

Figure 29A:
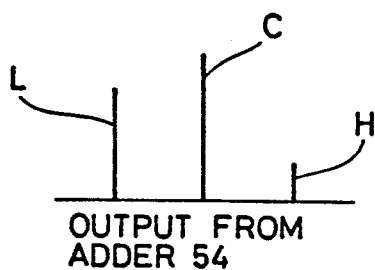
FIGS. 29A to 29D schematically show frequency spectra of output signals from respective portions of the circuit shown in FIG. 28 in a reproducing inner track of a CAV disc.
Figure 29B:
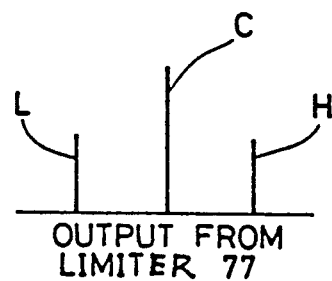
Figure 29C:
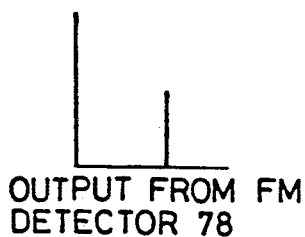
Figure 29D:
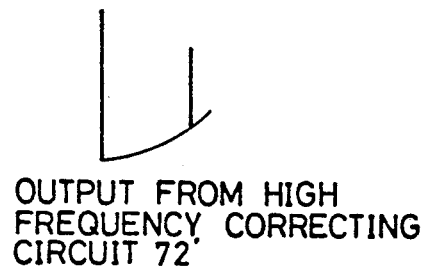
Figure 30A:
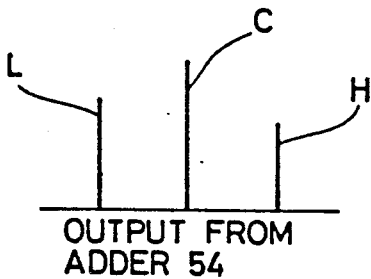
FIGS. 30A to 30D show frequency spectra of output signals from respective portions of the circuit shown in FIG. 28 in a playing outer track of the CAV disc.
Figure 30B:
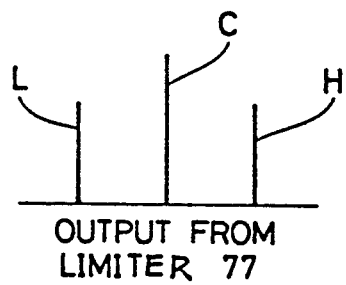
Figure 30C:
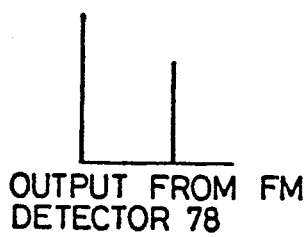
Figure 30D:
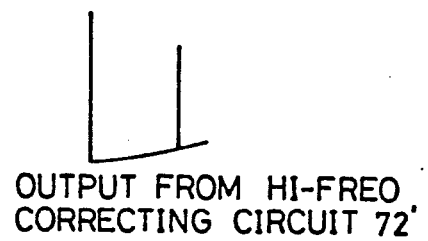

Frequency spectra of outputs from respective circuits shown in FIG. 28 in playing a video disc employing the CAV method are schematically shown in FIGS. 29A to 29D and in FIGS. 30A to 30D. FIGS. 29A to 29D show frequency spectra in playing inner track of the disc while FIGS. 30A to 30D show frequency spectra in playing outer track of the disc. FIGS. 29A and 30A each show a frequency spectrum of the output from the adder 54; FIGS. 29B and 30B show a frequency spectrum of the output from the limiter 77; FIGS. 29C and 30C each show a frequency spectrum of the output from the FM detector 79; and FIGS. 29D and 30D show frequency spectra of the output from the high frequency collecting circuit 72', respectively.

As is apparent from the comparison of FIGS. 29D and 30D, the amount of correction in high frequency correcting (inclination from the base) becomes larger in playing the inner track than in playing the outer track, and the amount gradually becomes smaller as the playing position of the disc moves from the inner track to the outer track.

As described above, according to the present invention, the diameter of the beam spot irradiating the optical disc, equivalent viewed from the point of electrical signal processing, is always made ½ of the diameter in the prior art, the 0 point in the frequency characteristic of the reproduced FM signal can be shifted to the higher frequency range, and the reproducing frequency band can be extended. In addition, the fluctuation of the 0 point and the degradation of the high frequency components derived from the difference of the linear velocity of the disc and from focus servo error and so on can be suppressed.

Since the amount of high frequency correction of the reproduced signals can be adjusted corresponding to the linear velocity (or reproducing position in the radial direction of the disc), the best high frequency correction can be always carried out with high precision regardless of the linear velocity (reproducing position) or the like of the disc, and therefore an extensively defined video disc having a wide recording frequency band can be played with superior frequency characteristics.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A circuitry for irradiating a medium on which information is recorded, in the form of pits, with a light beam and for reproducing said information by light reflected from said recording medium, wherein said pits are arranged on said recording medium to form recording tracks, said circuitry comprising:

converting means for converting said reflected light from said recording medium into electrical signals, said converting means including a first photoelectric converting means receiving said reflected light from a preceding side of said recording medium with respect to a direction of reproduction of information on said recording tracks and second photoelectric converting means receiving said reflected light from a succeeding side of said recording medium with respect to said direction of reproduction of information on said recording tracks;

delaying means for delaying an output from said first photoelectric converting means by a delay time, the delay time of said delaying means being variable;

time difference detecting means for detecting a time difference between an output from said second photoelectric converting means and an output form said delaying means and for outputting a signal corresponding to the detected time difference; and control means, response to an output signal from said time difference detecting means, of changing the delay time of said delaying means; and reproducing means for reproducing said information by using an output of said delaying means and an output from said second photoelectric converting means, wherein said recording medium is a rotatable optical disc and said control means sets the delay time of said delaying means at L/2v where L represents a diameter of said light beam irradiating said optical disc and v represents a linear velocity of said optical disc at a position irradiated with said light beam.

2. A circuitry for irradiating a medium on which information is recorded, in the form of pits, with a light beam and for reproducing said information by light reflected from said recording medium, wherein said pits are arranged on said recording medium to form recording tracks, said circuitry comprising:

converting means for converting said reflected light from said recording medium into electrical signals, said converting means including a first photoelectric converting means receiving said reflected light from a preceding side of said recording medium with respect to a direction of reproduction of information on said recording tracks and second photoelectric converting means receiving said reflected light from a succeeding side of said recording medium with respect to said direction of reproduction of information on said recording tracks;

delaying means for delaying an output from said first photoelectric converting means by a delay time, the delay time of said delaying means being variable, said delaying means comprises an LC delaying circuit formed of a coil and a capacitor;

time difference detecting means for detecting a time difference between an output from said second photoelectric converting means and an output from said delaying means and for outputting a signal corresponding to the detected time difference, said time difference detecting means comprises phase comparing means for detecting a phase difference between an output from said delaying means and an output from said second photoelectric converting means;

control means, responsive to an output signal from said time difference detecting means, for changing the delay time of said delaying means, said control means comprises a variable capacitance diode receiving the output from said phase comparing means at the cathode thereof, said variable capacitance diode constituting said capacitor; and reproducing means for reproducing said information by using an output of said delaying means and an output from said second photoelectric converting means.

3. A circuitry for irradiating a medium on which information is recorded, in the form of pits, with a light beam and for reproducing said information by light reflected from said recording medium, wherein said pits are arranged on said recording medium to form recording tracks, said circuitry comprising:

converting means for converting said reflected light form said recording medium into electrical signals, said converting means including a first photoelectric converting means receiving said reflected light from a preceding side of said recording medium with respect to a direction of reproduction of information on said recording tracks and second photoelectric converting means receiving said reflected light from a succeeding side of said recording medium with respect to said direction of reproduction of information on said recording tracks;

delaying means for delaying an output from said first photoelectric converting means by a delay time, the delay time of said delaying means being variable;

time difference detecting means for detecting a time difference between an output from said second photoelectric converting means and an output from said delaying means and for outputting a signal corresponding to the detected time difference;

first control means, responsive to an output signal from said time difference detecting means, for changing the delay time of said delaying means;

reproducing means for reproducing said information by using an output of said delaying means and an output from said second photoelectric converting means, wherein said information recorded on said recording medium represents at least frequency modulated signals;

means for amplifying, by a first correction amount, high frequency components of said frequency modulated signals, reproduced by said first and second photoelectric converting means, said first correction amount being variable; and second control means, responsive to the output from said time difference detecting means, for changing the first correction amount of said amplifying means.

4. A circuitry according to claim 3, wherein said second control means increases said first correction amount as a detected signal, from said time difference detecting means, indicates a larger time difference.

5. A circuitry according to claim 4, wherein said time difference detecting means includes means for detecting a phase difference between an output from said second photoelectric converting means and an output from said delaying means.

6. A circuitry according to claim 3, wherein at least frequency modulated base signals are recorded on said recording medium as said information, said circuitry further comprising:

means for demodulating said base signals by detecting said frequency modulated base signals reproduced by said first and second photoelectric converting means;

means for amplifying high frequency component of said demodulated base signal by a first amount of correction; and second control means responsive to an output from said time difference detecting means for changing said first amount of correction.

7. A circuitry according to claim 6, wherein said second control means increases said first amount of correction as the output signal, from said time difference detecting means, indicates larger time difference.

8. A method of reproducing recorded information by irradiating a light beam on a rotatable optical disc on which said information is recorded in the form of pits and by detecting light reflected from said optical disc by photo detecting means, wherein said photodetecting means comprises first photoelectric converting means for receiving reflected light from a preceding side of said rotatable optical disc with respect to a direction of rotation of said pits and second photoelectric converting means for receiving reflected light from a succeeding side of said rotatable optical disc with respect to said direction of rotation of said pits, said reproduction method comprising the steps of:

delaying an output from said first photoelectric converting means by a first delay time;

detecting a time difference between an output from said second photoelectric converting means and the output from said first photoelectric converting means delayed by said first delay time to output a detecting signal corresponding to the detected time difference; and changing said first delay time in response to said detecting signal to minimize the time difference between the output from said second photoelectric converting means and said delayed output from said first photoelectric converting means, wherein said step of minimizing the time difference comprises the step of increasing the first delay item when said detecting signal indicates that a difference between said delayed output from said first photoelectric converting means and said output from said second photoelectric converting means becomes larger.

9. A method of reproducing recorded information by irradiating a light beam on a rotatable optical disc on which said information is recorded in the form of pits and by detecting light reflected from said optical disc by photo detecting means, wherein said photodecting means comprises first photoelectric converting means for receiving reflected light from a preceding side of said rotatable optical disc with respect to a direction of rotation of said pits and second photoelectric converting means for receiving reflected light from a succeeding side of said rotatable optical disc with respect to said direction of rotation of said pits, said information stored on said optical disc representing a frequency modulated base signal, said reproduction method comprising the steps of:

delaying an output from said first photoelectric converting means by a first delay time;

detecting a time difference between an output from said second photoelectric converting means and the output from said first photoelectric converting means delayed by said first delay time to output a detecting signal corresponding to the detected time difference;

changing said first delay time in response to said detecting signal to minimize the time difference between the output from said second photoelectric converting means and said delayed output from said first photoelectric converting means;

amplifying high frequency component of said frequency modulated base signal reproduced by said first and second photoelectric converting means by a first amount of correction; and changing said first amount of correction in response to said detecting signal.

10. A method according to claim 9, wherein said step of changing said first amount of correction comprises the step of increasing said first amount of correction when said detecting signal indicates that said delayed output from said first photoelectric converting means precedes in time said output from said second photoelectric converting means.

11. A method of reproducing recorded information by irradiating a light beam on a rotatable optical disc on which said information is recorded in the form of pits and by detecting light reflected from said optical disc by photo detecting means, wherein said photodetecting means comprises first photoelectric converting means for receiving reflected light from a preceding side of said rotatable optical disc with respect to a direction of rotation of said pits and second photoelectric converting means from receiving reflected light from a succeeding side of said rotatable optical disc with respect to said direction of rotation of said pits, said information comprises a frequency modulated base signal, said reproduction method comprising the steps of:

delaying an output from said first photoelectric converting means by a first delay time;

detecting a item difference between an output from said second photoelectric converting means and the output from said first photoelectric converting means delayed by said first delay time to output a detecting signal corresponding to the detected time difference;

changing said first delay time in response to said detecting signal to minimize the time difference between the output from said second photoelectric converting means and said delayed output from said first photoelectric converting means;

demodulating said base signal by detecting said frequency modulated base signal reproduced by said first and second photoelectric converting means;

amplifying high frequency component of said demodulated base signal by a first amount of correction; and changing said first amount of correction in response to said detecting signal.

12. A method according to claim 11, wherein
said step of changing said first amount of correction comprises the step of increasing said first amount of correction when said detecting signal indicates that said delayed output from said first photoelectric converting means precedes in time said output from said second photoelectric converting means.

13. A method of reproducing recorded information by irradiating light beam on a rotatable optical disc on which said information is recorded in the form of pits and by detecting light reflected from said optical disc by photo detecting means, wherein said photodetecting means comprises first photoelectric converting means for receiving reflected light from a preceding side of said rotatable optical disc with respect to a direction of rotation of said pits and second photoelectric converting means for receiving reflected light from a succeeding side of said rotatable optical disc with respect to said direction of rotation of said pits, said reproduction method comprising the steps of:

delaying an output from said first photoelectric converting means by a first delay time;

detecting a time difference between an output from said second photoelectric converting means and the output from said first photoelectric converting means delayed by said first delay time to output a detecting signal corresponding to the detected time difference; and changing said first delay time in response to said detecting signal to minimize the time difference between the output from said second photoelectric converting means and said delayed output from said first photoelectric converting means.

wherein said first delay time is given as L/2v, where L represents a diameter of said light beam on a surface of said optical dic and v represents a linear velocity of said optical disc at a reproducing position by said photo detecting means.

* * * * *

UNITED STATES PATENT AND TRADEMARK OFFICE
CERTIFICATE OF CORRECTION

PATENT NO. : 5,073,886
DATED : December 17, 1991
INVENTOR(S) : Tooru SASAKI et al It is certified that error appears in the above-identified patent and that said Letters Patent is hereby corrected as shown below:

On the cover page, Item [30], delete "1-58614" and insert therefor -- 63-58614 --.

Signed and Sealed this

Twentieth Day of July, 1993

Attest:

MICHAEL K. KIRK

Attesting Officer

Acting Commissioner of Patents and Trademarks